(12) United States Patent
Farinelli, Jr. et al.

(10) Patent No.: US 9,888,081 B1
(45) Date of Patent: Feb. 6, 2018

(54) AUTOMATION APPARATUSES, SYSTEMS AND METHODS

(71) Applicant: Smart Farm Systems, Inc., Nicholasville, KY (US)

(72) Inventors: Robert P. Farinelli, Jr., Nicholasville, KY (US); Steve Christensen, Lexington, KY (US); James J. Suchora, Dunedin, FL (US); Ryan Heringer, Jonesboro, AR (US); Brandon Finch, Little Rock, AR (US); Gary Sterling, Shoreline, WA (US)

(73) Assignee: Smart Farm Systems, Inc., Nicholasville, KY (US)

( * ) Notice: Subject to any disclaimer, the term of this patent is extended or adjusted under 35 U.S.C. 154(b) by 571 days.

(21) Appl. No.: 14/625,397

(22) Filed: Feb. 18, 2015

Related U.S. Application Data

(60) Provisional application No. 61/941,080, filed on Feb. 18, 2014.

(51) Int. Cl.
  *G05B 15/02* (2006.01)
  *H04W 24/08* (2009.01)
  (Continued)

(52) U.S. Cl.
  CPC ............ *H04L 67/125* (2013.01); *G05B 15/02* (2013.01); *H04L 67/10* (2013.01); *H04W 24/08* (2013.01);
  (Continued)

(58) Field of Classification Search
  CPC ....... H04L 67/125; H04L 67/10; G05B 15/02; H04W 24/08; H04W 40/20; H04W 40/16; H04W 84/18
  See application file for complete search history.

(56) References Cited

U.S. PATENT DOCUMENTS

| | | |
|---|---|---|
| 5,274,307 A | 12/1993 | Christensen |
| 5,577,128 A | 12/1996 | Farinelli, Jr. |

(Continued)

OTHER PUBLICATIONS

"Groundwater Supply and Use," Wellowner.org, http://wellowner.org/groundwater/groundwater-supply-use/.

(Continued)

*Primary Examiner* — Ronald Hartman, Jr.
(74) *Attorney, Agent, or Firm* — Crawford Maunu PLLC

(57) ABSTRACT

Automation is effected for various remote circuits. As may be implemented in accordance with one or more embodiments, environmental characteristics are monitored at each of a plurality of remote systems located at different geographical regions (e.g., remote agricultural systems, or other equipment) and controlled by one or more local/master systems. Data indicative of the monitored environmental characteristic is communicated and used for controlling operational equipment, based upon operational instructions communicated from the master system. These communications are carried out by monitoring communication characteristics of communications paths between the master system and the remote systems, with some communication paths including one or more of the remote systems via which communications are passed (e.g., relayed). One of the communication paths is selected based upon the monitored communication characteristics, and used for communicating the operational instructions with the remote systems.

20 Claims, 13 Drawing Sheets

(51) Int. Cl.
H04W 40/20 (2009.01)
H04W 40/16 (2009.01)
H04W 84/18 (2009.01)
H04L 29/08 (2006.01)

(52) U.S. Cl.
CPC ........... *H04W 40/16* (2013.01); *H04W 40/20* (2013.01); *H04W 84/18* (2013.01)

(56) References Cited

U.S. PATENT DOCUMENTS

| | | | |
|---|---|---|---|
| 5,666,428 A | 9/1997 | Farinelli et al. | |
| 5,761,320 A | 6/1998 | Farinelli et al. | |
| 6,735,630 B1* | 5/2004 | Gelvin | B60R 25/1004 706/33 |
| D496,924 S | 10/2004 | Salyer et al. | |
| D497,901 S | 11/2004 | Farinelli | |
| D497,902 S | 11/2004 | Farinelli et al. | |
| D498,745 S | 11/2004 | Sayler et al. | |
| 6,972,682 B2* | 12/2005 | Lareau | G06Q 10/08 340/5.92 |
| 7,248,893 B2 | 7/2007 | Christensen et al. | |
| 7,349,360 B2* | 3/2008 | Gutierrez | H04L 45/00 370/252 |
| 7,526,539 B1* | 4/2009 | Hsu | H04L 12/2818 709/203 |
| 7,664,273 B2 | 2/2010 | Christensen et al. | |
| 7,853,663 B2* | 12/2010 | Hoerl | H04L 41/04 709/208 |
| 8,219,705 B2* | 7/2012 | Shorty | H04L 29/06027 709/237 |
| 9,082,294 B2* | 7/2015 | Willig | H04Q 9/00 |
| 2003/0137968 A1* | 7/2003 | Lareau | G06Q 10/08 370/349 |
| 2004/0233855 A1* | 11/2004 | Gutierrez | H04L 45/00 370/252 |
| 2006/0285514 A1* | 12/2006 | Hoerl | H04L 41/04 370/328 |
| 2006/0290487 A1* | 12/2006 | McKinney | G05B 15/02 340/506 |
| 2007/0177576 A1* | 8/2007 | Johansen | H04L 29/06027 370/351 |
| 2007/0206521 A1* | 9/2007 | Osaje | G01D 4/004 370/315 |
| 2007/0255116 A1* | 11/2007 | Mehta | A61B 5/0002 600/300 |
| 2009/0150002 A1 | 6/2009 | Fekete | |
| 2010/0038440 A1 | 2/2010 | Ersavas | |
| 2011/0035059 A1 | 2/2011 | Ersavas | |
| 2011/0045875 A1* | 2/2011 | Rhee | H04B 1/7156 455/574 |
| 2013/0095747 A1* | 4/2013 | Moshfeghi | H04W 88/06 455/7 |
| 2013/0181847 A1* | 7/2013 | Willig | H04Q 9/00 340/870.03 |

OTHER PUBLICATIONS

Y. Kim and R. G. Evans, "Software Design for Wireless Sensor-Based Site-Specific Irrigation," Computers and Electronics in Agriculture 66 (2009): 159-165.

L. Ruiz-Garcia, L. Lunadei, P. Barreiro, and I. Robla, "A Review of Wireless Sensor Technologies and Applications in Agriculture and Food Industry: State of the Art and Current Trends," Sensors 9 (2009): 4728-4750.

E. J. Sadler, R. G. et.al. "Opportunities for Conservation with Precision Irrigation," Journal of Soil and Water Conservation 60, No. 6 (2005): 371-379.

D. Kohanbash, A. Valada, and G. A. Kantor, "Base Station Design and Architecture for Wireless Sensor Networks," International Conference of Agricultural Engineering (CIGR), Jul. 2012.

D. Kohanbash, A. Valada, G. A. Kantor, 2012. "Irrigation Control Methods for Wireless Sensor Network." ASABE Paper No. 121337112, St. Joseph, Michigan.

C. Hedley, S. Bradbury, et al. "Farm-Scale Trials of Variable Rate Irrigation to Assess the Benefits of Modifying Existing Sprinkler Systems for Precision Application," International Journal of Agricultural Mgmt 1, No. 2 (2011): 51-55.

C. B. Hedley, J. Ekanayake, and P. Roudier, 2012. "Wireless Soil Moisture Sensor Networks for Precision Irrigation Scheduling," In: Advanced Nutrient Management: Gains from the Past-Goals for the Future. http://flrc.massey.ac.nz/publications.html. Occasional Report No. 25. Fertilizer and Lime Research Centre, Massey University, Palmerston N., New Zealand.

R. Coates, M. Delwiche, A. Broad, M. Holler, R. Evans, L. Oki, and L. Dodge, 2012. "Wireless Sensor Network for Precision Irrigation Control in Horticultural Crops." ASABE Paper No. 121337892. St. Joseph, Michigan: ASABE.

Y. Kim, R. G. Evans, and W. M. Iversen, "Remote Sensing and Control of an Irrigation System Using a Distributed Wireless Sensor Network," IEEE Transactions on Instrumentation & Measurement 57, No. 7 (Jul. 2008): 1379-87.

T. J. Pierce and T. V.Elliot, "Regional and On-Farm Wireless Sensor Networks for Agricultural Systems in Eastern Washington", Computers and Electronics in Agriculture 61, No. 1 (Apr. 2008): 32-43. Aabstract Only.

G. Barrenetxea, F. Ingelrest, G. Schaefer, M. Vetterli, O. Couach, and M. Parlange, "SensorScope: Out-of-the-Box Environmental Monitoring," Proceedings of the ACM/IEEE International Conference on Information Processing in Sensor Networks (Apr. 2008): 332-343.

Y. Liu, Y. He, M. Li, J. Wang, K. Liu, L. Mo, W. Dong, Z. Yang, M. Xi, J. Zhao, and X. Li, "Does Wireless Sensor Network Scale? A Measurement Study on GreenOrbs," INFOCOM, 2011 Proceedings IEEE (Apr. 10-15, 2011): 873-881.

P. Buonadonna, D. Gay, J. Hellerstein, W. Hong, and S. Madden. "TASK: Sensor Network in a Box." Proceedings of the 2nd European Workshop on Wireless Sensor Networks, pp. 133-144, IEEE Computer Society, Los Alamitos, California, USA, Jan.-Feb. 2005.

T. Arici, B. Gedik, Y. Altunbasak, and L. Liu, "PINCO: A Pipelined In-Network Compression Scheme for Data Collection in Wireless Sensor Networks." Proceedings of the 12th International Conference on Computer Communications and Networks, 2003. ICCCN 2003 (2003), pp. 539-544.

S. K. Chong, et al., "Energy-Aware Data Processing Techniques for Wireless Sensor Networks: A Review," presented at T. Large-Scale Data- and Knowledge-Centered Systems, 2011, pp. 117-137.

Enorasis Consortium (2012), "Environmental Optimization of Irrigation Management with the Combined Use and Integration of High Precision Satellite Data, Advanced Modeling, Process Control and Business Innovation." D1.1: State of the Art Technical Analysis Report Version 1.2 May 30, 2012.

Z. Li, "Development of Wireless Sensor Network Technology for Soil Property Monitoring" (graduate thesis, Oklahoma State University, 2009).

R. Kulkarni, A. Forster, and G. Venayagamoorthy, "Computational Intelligence in Wireless Sensor Networks: A Survey," IEEE Communications Surveys & Tutorials 13, No. 1 (First Quarter 2011): 68-96.

D. Chen and P. K. Varshney, "QoS Support in Wireless Sensor Networks: A Survey," Proceedings of the 2004 International Conference on Wireless Networks (ICWN 2004), Las Vegas, Nevada, USA (Jun. 2004), 227-233.

G. J. Pottle and W. J. Kaiser, "Wireless Integrated Network Sensors," Communications of the ACM 43, No. 5 (May 2000): 52-58.

P. Rundel, E. et al., "Environmental Sensor Networks in Ecological Research," New Phytologist 182, No. 3 (May 2009): 589-607.

N. Wang, N. Zhang, M. Wang, "Wireless Sensors in Agriculture and Food Industry—Recent Development and Future Perspective," Computers and Electronics in Agriculture 50, No. 1 (Jan. 2006): 1-14.

(56) References Cited

OTHER PUBLICATIONS

S. Amosson, L. New, L. Almas, F. Bretz, and T. Marek. 2001. "Economics of Irrigation Systems." B-6113. Texas Cooperative Extension, Texas A & M University System Extension, College Station, Texas.

* cited by examiner

|    | N0 | N1 | N2 | N3 | N4 | N5 | N6 | N7 | N8 | N9 |
|----|----|----|----|----|----|----|----|----|----|----|
| N0 | -1 | 72 | 80 | 85 | 60 | 70 | 0  | 0  | 0  | 0  |
| N1 | 72 | -1 | 66 | 0  | 69 | 0  | 0  | 0  | 0  | 0  |
| N2 | 80 | 66 | -1 | 0  | 68 | 0  | 0  | 0  | 0  | 0  |
| N3 | 85 | 0  | 0  | -1 | 0  | 86 | 0  | 73 | 44 | 0  |
| N4 | 60 | 69 | 68 | 0  | -1 | 0  | 0  | 0  | 0  | 0  |
| N5 | 70 | 0  | 0  | 86 | 0  | -1 | 71 | 82 | 0  | 0  |
| N6 | 0  | 0  | 0  | 0  | 0  | 71 | -1 | 90 | 83 | 89 |
| N7 | 0  | 0  | 0  | 73 | 0  | 82 | 71 | -1 | 91 | 92 |
| N8 | 0  | 0  | 0  | 44 | 0  | 0  | 83 | 91 | -1 | 88 |
| N9 | 0  | 0  | 0  | 0  | 0  | 0  | 89 | 92 | 88 | -1 |

FIG. 11

|    | N0 | N1 | N2 | N3 | N4 | N5 | N6 | N7 | N8 | N9 |
|----|----|----|----|----|----|----|----|----|----|----|
| N0 |    | 72 | 80 | 85 | 60 | 70 | 0  | 0  | 0  | 0  |
| N1 |    |    | 66 | 0  | 69 | 0  | 0  | 0  | 0  | 0  |
| N2 |    |    |    | 0  | 68 | 0  | 0  | 0  | 0  | 0  |
| N3 |    |    |    |    | 0  | 86 | 0  | 73 | 44 | 0  |
| N4 |    |    |    |    |    | 0  | 0  | 0  | 0  | 0  |
| N5 |    |    |    |    |    |    | 71 | 82 | 0  | 0  |
| N6 |    |    |    |    |    |    |    | 90 | 83 | 89 |
| N7 |    |    |    |    |    |    |    |    | 91 | 92 |
| N8 |    |    |    |    |    |    |    |    |    | 88 |
| N9 |    |    |    |    |    |    |    |    |    |    |

FIG. 12

AUTOMATION APPARATUSES, SYSTEMS AND METHODS

FIELD

Various embodiments are directed to automation control, and more specifically to automation control involving wireless-based communications and routing.

BACKGROUND

Various systems employ multiple remote equipment locations that operate to serve geographical areas that are specific to each location. Such systems can be implemented on an integrated level, with remote control and related communication. Agricultural, environmental and manufacturing environments can employ such systems.

While such systems have been useful, there has been many challenges to their implementation. For instance, communications can be expensive, particularly when employing cellular or satellite type communications for remote equipment for which wired communications are not readily accessible. Similarly, sensor systems and their integration can also be expensive, which can sometimes render such systems cost prohibitive. Further, controlling remote systems from a central location can present challenges to tailoring the operation of each remote system to suit its particular needs. For example, it is often difficult or impossible to ascertain conditions at multiple locations in a timely manner, or to separately control respective systems that are grouped despite that certain grouped systems may be subject to disparate conditions or operating nuances. In addition, equipment failure can go undetected where detection and communications are not robust or simply not in place.

These and other matters have presented challenges to automation and control, for a variety of applications.

SUMMARY

Various example embodiments are directed to apparatuses, systems, and methods as well as their implementation with wireless communications. Specific embodiments are directed to wireless monitoring and control apparatuses and methods for geographically large area systems with multiple sensor and control end points. Robust, high quality of service wireless communications are facilitated to and from sensors and control end points. Monitoring and data aggregation are carried out for a wide variety of system variables and constants. Data analysis, adaptive learning and automation control methods are implemented for both site specific control points as well as overall communication system protocols.

Various embodiments are directed to addressing challenges to the control of one or more apparatuses, environments and systems. For example, various aspects address performance drops due to bottlenecks at nodes receiving excessive incoming traffic, and collisions of concurrently transmitted packets. Certain aspects address challenges associated with QoS support such as unbalanced traffic, network dynamics, scalability and packet criticality, among others. Configuring a large-area network is a challenge due to ground-reflected cancellations, changes in crop heights, multipath and interferences caused by obstructions. Gaps in the data flow from sensor networks present a widespread and pervasive problem. Further aspects address challenges to the scalability and deployment of large numbers of moisture sensor remains. Some embodiments address challenges relating to irrigation, such as those relating to practicality and accuracy of automated controls.

Some embodiments are directed to geographically large area wireless monitoring and control systems suitable for precision irrigation of large-area farms, quality control of storage facilities and real time environmental monitoring at large scale industrial sites, all with multiple sensor and control end points. In one implementation, a central control computer provides manual and automatic monitoring and control of equipment and remotely located sensors. In certain implementations, this stand-alone system does not rely on an external service provider (such as satellite or cellular) for its on-site operation and can take advantage of remote monitoring and control should internet connections be available.

Another embodiment is directed to an apparatus as follows, and which may be implemented with a master control circuit as discussed herein. A wireless communication circuit communicates with a multitude of slave control circuits at disparate geographical regions using a wireless-based communications network. A monitoring circuit operates with the wireless communication circuit to monitor communication characteristics of a plurality of communications paths via which data is communicated with the slave control circuits, at least some of the communication paths passing through one or more of the slave control circuits. A routing circuit selects, for each of the slave control circuits, at least one of the communication paths for communicating with the slave control circuit based upon the monitored communication characteristics.

A control circuit operates with the wireless communication circuit, the monitoring circuit and routing circuit operate to control each slave control circuit by communicating operational instructions to the slave control circuit using the selected one of the communication paths, and ascertain environmental characteristics sensed by each slave control circuit via the selected one of the communication paths. In response to the ascertained environmental characteristics, operation of the slave control circuit is modified by communicating revised operational instructions to the slave control circuit using the selected one of the communication paths. In response to the monitoring circuit selecting a different one of the communication paths, communicating with the slave control circuit using the different one of the communication paths. In some implementations, the control circuit controls operation of the slave control circuit by transmitting equipment operational instructions that control the slave control circuit to operate equipment connected to the slave control circuit, based upon the ascertain environmental characteristics. Various implementations also include the slave control circuits.

Another embodiment is directed to a method as follows. An environmental characteristic is monitored at each of a plurality of sensor circuits respectively located at different geographical regions. For each of the sensor circuits, data indicative of the monitored environmental characteristic is communicated to one of a plurality of slave control circuits. At each slave control circuit, control signals are output to control operational equipment based upon operational instructions received from a master control circuit and based on the monitored environmental characteristic.

At a master control circuit, the operational instructions are communicated with the slave control circuits using a wireless-based communications network having wireless communication links between ones of the slave control circuits and with the master control circuit as follows. Communication characteristics are monitored for a plurality of communications paths between the master control circuit and one of the slave control circuits, each communication path including at least two of the wireless communication links and at least one of the slave control circuits via which communications are passed to another one of the slave control circuits. One of the communication paths is selected based upon the monitored communication characteristics, and used for communicating the operational instructions between the master control circuit and the one of the slave control circuits.

The above summary is not intended to describe each embodiment or every implementation of the present disclosure. The figures and detailed description that follow also exemplify various embodiments.

BRIEF DESCRIPTION OF THE FIGURES

Various example embodiments may be more completely understood in consideration of the following detailed description in connection with the drawings, in which:

FIG. 11 shows a link discovery table, as may be implemented in accordance with one or more embodiments;

FIG. 12 shows a symmetrical link integrity communication data table, in accordance with another embodiment;

Figure 1:
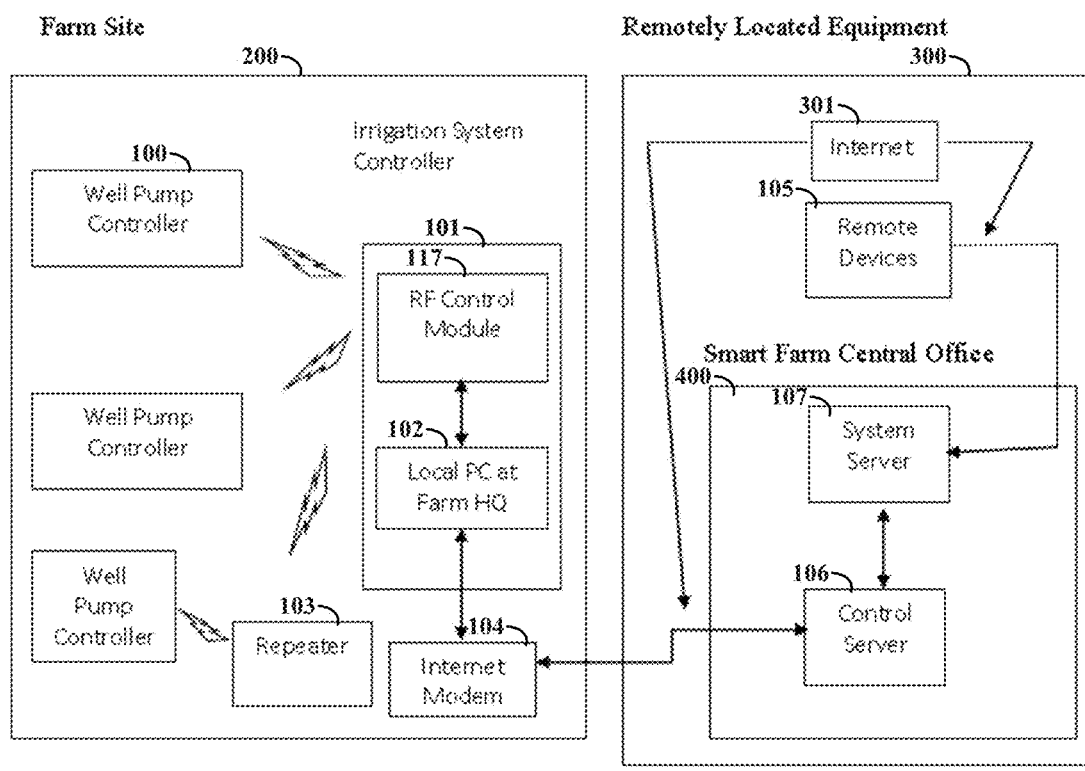
FIG. 1 shows an automation control apparatus, in accordance with an embodiment.

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving wireless communication and control. While not necessarily so limited, various aspects may be appreciated through a discussion of examples using this context.

Various example embodiments are directed to a wireless system and/or method involving a wireless sensor network with a plurality of sensor nodes for monitoring environmental, soil, water, chemical, crop and equipment operational status and performance and controlling one or more pieces of remotely located equipment such as pump stations and storage facilities. The wireless system includes autonomous control at each equipment site, a centralized computer for control of all end points as well as a remote server system for data aggregation and analysis that will also provide web based access to the centralized computer for system control. The wireless system includes an adaptive and self-healing wireless communications protocol that minimizes network traffic and congestion.

In various contexts, such embodiments and others herein may employ a stand-alone type wireless communication network, as may involve RF communications between antennas located at remote equipment sites and one or more central cites. For long-distance communications, different remote equipment sites can be used as relays to relay signals to different antennas, permitting communications across vast distances. Integrity of communication links can be monitored and the monitoring can be used to implement one of a variety of communication paths to reach remote equipment. Such approaches can be implemented to provide robust, cost-effective monitoring and control of remote systems, such as for agricultural irrigation systems, with monitoring tailored to specific remote geographical sites at which the remote equipment is located.

Aspects of the present disclosure relate in general to geographically large area wireless monitoring and control systems with multiple sensor and control end points. Various embodiments involve hardware implementations that exemplify configuration of components used to perform both monitoring and control functions. A central system computer includes a software feature set that monitors a wide variety of system variables and constants and provides data analysis, adaptive learning and automation control of end points to insure system performance, such as reduced energy and water consumption or increased crop yield production. In some implementations, such embodiments involve a wireless monitoring and control system that includes three levels of control, 1) autonomous control at each equipment site, 2) centralized control at a facility headquarter site and 3) a remote server system that also provides web based access to the centralized computer for system control from any location in the world. A proprietary communications protocol insures quality of wireless communication service to all end points from a central system computer. In various embodiments, wireless communications between the central system and remote nodes in this regard involve a self-contained long-range (e.g., miles) wireless network, without necessarily involving outside networks such as cellular or satellite-based networks.

Various embodiments are directed to using 900 MHZ wireless technologies and moisture sensors, with a precision irrigation control system for large area farms. This can help farmers reduce energy and labor consumption, improve crop yields and maintenance costs and irrigation losses due to runoff. Sensor feedback is used to improve the spatial and temporal management of irrigation decision making processes. Environment, geological and equipment performance parameters are monitored. Also measured are irrigation start times, changes in irrigation advance rates (meaning how long it takes water to reach the furthest end of the field once the pump starts running) and soil saturation rates without the need for large numbers of sensors calibrated to site-specific conditions. This embodiment provides actionable information and enable pump turn-off routines to be easily modified with low risk.

Certain embodiments are directed to reducing water and energy consumed by ground water irrigated farms, using real-time monitoring and controls at remotely located pump stations. By continuously monitoring soil moisture in each pump zone, precision irrigation systems can adapt to ever-changing environmental and soil conditions. It is possible to monitor soil moisture content at the furthest extreme of each pump zone to predict pump turn off times to help minimize off-field migration of soil, water, nutrients and chemicals. By monitoring the performance parameters of electric- and diesel-driven well pumps, additional maintenance expense and energy-savings can be achieved through motor speed optimization and enhanced preventative maintenance schedules. Various aspects are directed to a system that can monitor and control system variables that will be able to reduce carbon, nitrogen and water footprints.

Boosting agricultural productivity benefits from fine tuning of controllable system variables on a farm, which can be effected continuously. A fully integrated remote monitoring and control system is implemented to help farmers maximize their ability to deal simultaneously with ever-changing conditions. Such a system may provide the technology to accomplish this objective to conserve energy, reduce ground water consumption, improve crop yields, reduce equipment maintenance and labor costs.

Monitoring and control facilitates software tools to provide both manual and automatic remote control of equipment, based on fault alarms and process variable limit triggers. Real-time adaptive learning and control routines utilizing statistical data analysis facilitate expert systems that can boost productivity.

Various embodiments are directed to mitigating under-watering that causes crop stress and yield reduction, and over-watering that consumes more water and fuel than necessary and leads to soil erosion, fertilizer, herbicide and pesticide runoff. Run-off mitigation can reduce unnecessary evaporation, unwanted transpiration and deep percolation water losses. Embodiments are directed to insuring that each field gets just the right amount of water at just the right time. Watering schedules are modified on a field-by-field, as-needed, real-time basis, employing communications and sensors as characterized herein. In some embodiments, the well water needs to each field is based on moisture retention and evaporative loss of the soil, environmental factors such as temperature, rainfall, sunlight, humidity, type and maturity of the crop.

Certain embodiments are directed to an apparatus having a plurality of sensor circuits and slave control circuits, and a master control circuit. The sensor circuits are respectively located at different geographical regions, and monitor an environmental characteristic (e.g., atmospheric conditions, chemical characteristics, organic characteristics and operational equipment characteristics) within the respective region in which the sensor is located. The slave control circuits have an input port connected to one or more sensor circuits, and may be implemented such at each geographical region includes a slave control circuit. In this context, the "slave" control circuit may operate in response to the master control circuit, or independently for certain implementations (e.g., where communication with the master control circuit is interrupted). Various ones of the slave control circuits receive communications indicative of the monitored environmental characteristic from one or more of the sensor circuits coupled to the slave control circuit, and includes a wireless communication circuit that wirelessly communicates with wireless communication circuits at other ones of the slave control circuits and at the master control circuit. Each slave control circuit also includes a computer processor circuit that controls operational equipment to which the received communications pertain, by outputting control signals to the operational equipment based upon the received communications and the monitored environmental characteristic. For instance, in some embodiments, one or more sensors operate to sense water conditions such as rainfall and soil moisture, which are used to control irrigation equipment.

The master control circuit wirelessly communicates with the slave control circuits, either directly via a direct wireless link or by relaying signals via one or more slave control circuits (e.g., implemented as a relay and/or as a relay that also controls operational characteristics as noted above). The master control circuit has a computer processor circuit (e.g., one or more processors in communication with one another), and operates with the slave control circuits and the wireless communication circuits to wirelessly communicate using a wireless-based communications network with wireless communication links between ones of the slave control circuits and one or more wireless links between the master control circuit and one or more of the slave control circuits as follows. Communication characteristics are monitored for a plurality of communications paths between the master control circuit and one of the slave control circuits, with each communication path including at least two of the wireless communication links and at least one of the slave control circuits via which communications are passed to another one of the slave control circuits. One or more of the communication paths are selected based upon the monitored communication characteristics and used for communicating data between the master control circuit and the one of the slave control circuits. In some implementations, the master control circuit selects and uses a frequency for communicating via the wireless-based communications network, based upon the monitored communication characteristics.

Communication paths may be selected in one or more of a variety of manners. For instance, a communication path involving multiple links may be selected based upon communication characteristics of different ones of communication paths in the links as may relate to interference, received signal strength indication (RSSI), and/or bit error rate (BER). An indication of multipath interference may be calculated based upon received signal strength and bit error rate for respective ones of the communication paths. Paths may be also selected based on length and interference. Data indicative of the selected paths may be stored for later access.

In some embodiments, one of the communication paths is selected based on monitored communication characteristics changing over time. Such an approach may, for example, be carried out for monitoring geographical regions including agricultural crops, with sensor circuits that monitor environmental characteristics that affect crop growth. The communication path is selected in response to crop growth that affects the wireless-based communications via the communication paths.

For certain embodiments, a data routing table is maintained with data indicative of communication paths through respective ones of the slave circuits. The master control circuit operates with the slave control circuits to communicate data based upon routing data in the table. Where new routing path links are determined (e.g., in response to a current link having an issue), the routing table is updated with data representing the new routing path links based upon the monitored communication characteristics.

In some implementations, the master control circuit operates with the slave control circuits to ascertain integrity of communication links with respective ones of the slave control circuits as follows. Transmit and receive integrity is ascertained by communicating between the master control circuit and the slave control circuits via the wireless communication circuits, and by communicating between the slave control circuits (e.g., as directed by the master control circuit). A data table is stored with data that characterizes the transmit and receive integrity of the communication links. The communication paths are then selected based upon the data in the data table. In some implementations, the master control circuit responds to detecting a drop in communication integrity with one of the slave control circuits by controlling the slave control circuit to re-ascertain the transmit and receive integrity of the communication, and overwrites data in the data table that characterizes the transmit and receive integrity of the communication links with the one of the slave control circuits.

The slave circuits may also monitor and implement communication links, as may be implemented autonomously. In some embodiments, one or more of the slave control circuits monitors communication characteristics of communications paths between the slave control circuit and other ones of the slave control circuits, selects one of the communication paths based upon the monitored communication characteristics, and communicates data between the master control circuit and one of the slave control circuits using the selected one of the communication paths.

The master control circuit operates to control slave circuits in a variety of manners. In some embodiments, the master control circuit controls the slave control circuits, based upon sensor data received from one of the sensor circuits, to control equipment to which it is connected. In certain embodiments, one or more of the slave control circuits autonomously controls equipment to which it is connected, independently from information communicated by the master control circuit, in response to sensor data received from one of the sensor circuits connected to the one of the slave control circuits. This latter approach may be implemented, for example, when communications between the master and slave control circuit are interrupted, with the slave circuit operating autonomously (or, e.g., using a previous communication from the master control circuit).

Turning now to the Figures, various figures are described in the context of particular applications, such as agricultural applications, yet may be implemented for a variety of types of systems and environments involving the remote control of equipment. Further, while certain figures refer back to embodiments in other figures for particular applications or by way of example implementation, each figure represents one or more embodiments that may be separately implemented. For instance, aspects of FIGS. 2 and 3 referring back to irrigation controllers in FIG. 1 may be implemented with other embodiments, involving other equipment controllers. Further, components within each figure may be implemented separately, such as those in the Farm Site and Remotely Located Equipment regions of FIG. 1.

Referring to FIG. 1, an apparatus includes Farm Site Equipment (200) (e.g., a master control circuit) and Remotely Located Equipment (300) (e.g., slave control circuit). The Irrigation System Controller (101) at the Farm Site (200) includes an RF Control Module (117) connected via USB interface a Local PC at Farm HQ (102). The RF Control Module (117) communicates wirelessly with all the Well Pump Controllers (100) (labeled by way of example) on the Farm Site (200). A Well Pump Controller (100) that is out of range from the Irrigation System Controller (101) will communicate with one or more repeater stations (103) which then communicates back to the Irrigation System Controller (101). The Local PC at Farm Head Quarters (102) manages the wireless communications traffic flow between the RF Control Module (117) and each Well Pump Controller (100) in the field.

The Local PC at Farm HQ (102) hosts the user interface application for display and control of the entire Farm Site (200). An external internet connection is not required for autonomous operation of this system; the Local PC at Farm Head Quarters (102) can control the entire Farm Site (200) on a stand-alone basis.

Optionally the Local PC at Farm Head Quarters (102) can connect to an Internet Modem (104) for off-site control of the system from Remotely Located Equipment (300) should an Internet (301) connection be available. The Smart Farm Central Office (400) contains a web-based System Server (107) which is a low-level server providing remote login access via a secure link from Remotely Located Equipment (300) to the system. The Control Server (106) can provide Web access to any Farm site (200) and hosts standard HTML pages to the Remotely Located Equipment (300) once a secured link is established. The Control server (106) is used as a go-between for Remote Devices (105) (e.g., a tablet PC or smart phone on the Internet) and a target Local PC at Farm Head Quarters (102). The Control Server (106) may also back up "in the cloud" each farmer's data and configuration files as well as provide remote diagnostics and software updates.

Figure 2:
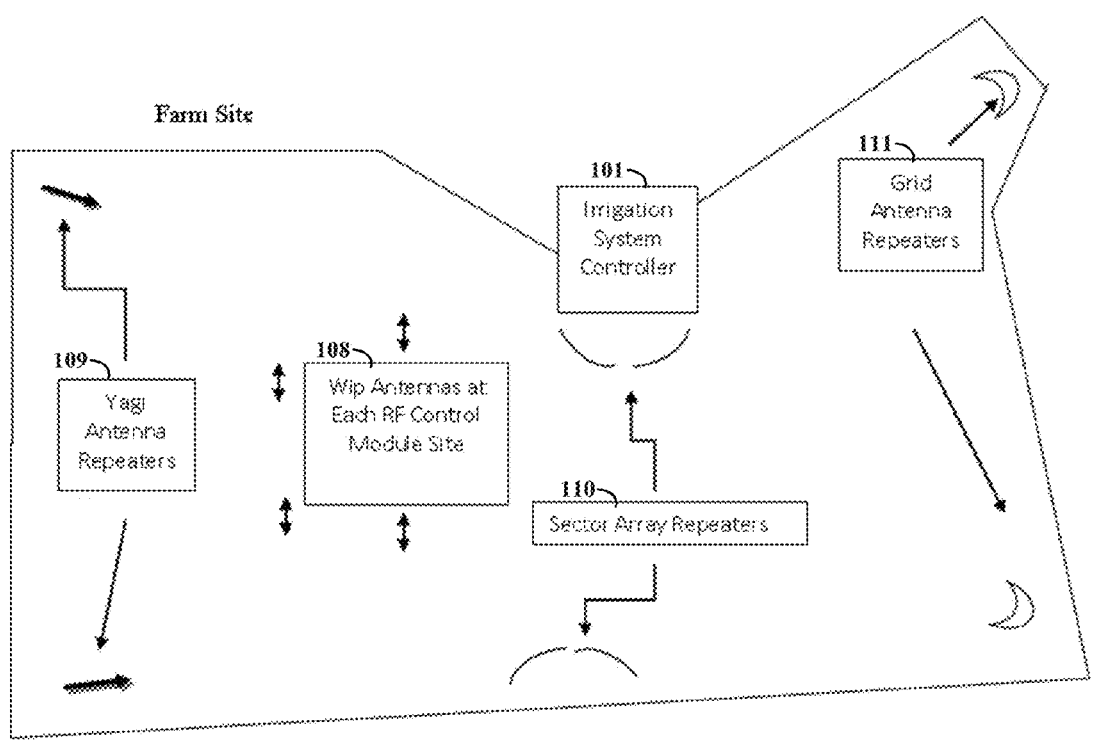
FIG. 2 shows a network communications system, in accordance with another embodiment.

FIG. 2 shows a system network communications physical grid layout at a Farm Site, which by way of example is shown as being implemented with the Farm Site (200) in FIG. 1, showing a relationship between the Irrigation System Controller (101), system Repeaters (109, 110, 111) and WIP antennas (108) connected to each RF Control Module (117) at each well pump. Multiple different antenna types can be used to insure optimum performance of the system. In some implementations, 7 dBi gain mobile WIP antennas (108) are used at each Well Pump Controller (100); 13 dBi gain Yagi antennas (109) are used on Well Pump Controller (100) which can be located more than 2 miles away from the nearest Repeater (109, 110, 111); 15 dBi Grid antennas are used for Repeaters (111) on a tower in corners or down narrow parts of a farm and 13 dBi gain Sector antennas are used for Repeaters (110) placed in arrays mid Farm Site (200). FIG. 2 shows an implementation of each of these 4 antenna types deployed on the Farm Site (200). Towers can be used for Sector Array Repeaters (110).

Figure 3:
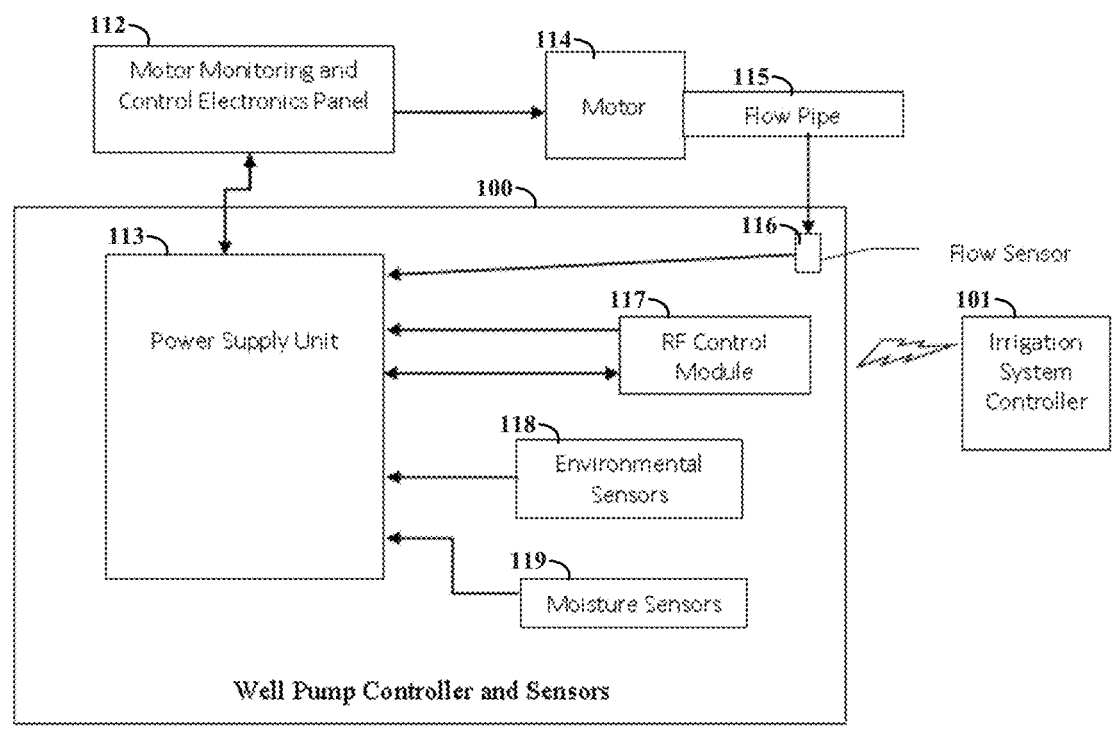
FIG. 3 shows an equipment site apparatus, in accordance with another embodiment.

FIG. 3 is an example well site configuration, showing the physical relationship between the farmers existing equipment on site (Motor Monitoring and Control Electronics Panel (112), Motor (114) and Flow Pipe (115)) and equipment to control equipment by the Irrigation System Controller (101). This includes the Power Supply Unit (113), RF Control Module (117), and Sensors (116, 118, and 119). A two-module approach provides surge and transient protection to the sensitive RF Control Module (117) circuitry as well as flexibility in customizing the power supply unit for controlling other types of equipment.

The Motor Monitoring and Control Electronics Panel (112) provides power to the Power Supply Unit (113), which in turn powers the RF Control Module (117). The Power Supply Unit (113) monitors analog and digital signals available from The Motor Monitoring and Control Electronics Panel (112), Flow Pipe Sensor (116), Environmental Sensors (118) and Soil Moisture Sensors (119).

For diesel motor pump configurations the Motor Monitoring and Control Electronics Panel (112) may have gauges and sensors which monitors motor run time, motor temperature, motor speed, motor torque, oil, gas and coolant levels, motor fault conditions, gas cap and motor tampering indicators, diesel battery and alternator charge current plus other various diesel motor parameters. The Power Supply Unit (113) monitors available signals from the Motor Monitoring and Control Panel (112). In some implementations, the Motor Monitoring and Control Panel (112) contains microprocessor based solid state controls and performance indicators available on the serial bus from these types of control panel modules are monitored by the Power Supply Unit (113) via a CAN interface buss.

For electric pump configurations the Power Supply Unit (113) monitors signals from the Motor Monitoring and Control Electronics Panel (112) such as AC Mains input voltage to the motor, current draw and various other parameters and performance indicators available from variable frequency drive motors if in place at the pump site.

The Flow Pipe Sensor (116) indicates when the pump has started and whether or not water is flowing in the Flow Pipe (115) to the system. A positive flow signal from the sensor indicates that: a) the motor is running, b) the drive shaft is intact, c) the pump at the bottom of the well is pumping, and d) water has begun to irrigate the field.

The Environmental Sensors (118) monitor temperature, humidity, solar radiation, barometric pressure, rain fall, wind speed and direction. The Soil Moisture Sensors (118) monitor soil moisture, electro-conductivity, fertilizer and pesticide levels in the soil.

The signals from these various sensors are conditioned in the Power Supply Unit (113) then routed to the RF Control Module (117) which then communicates their status wirelessly to the Irrigation System Controller (101). The Local PC at Farm HQ (102) processes the information and then provides a control signal wirelessly back to each RF Control Module (117). The RF Control Module (117) then provides signals to the Power Supply Unit (113) which will turn a pump motor (114) on or off based on conditions in the field associated with the Motor Monitoring and Control Electronics (112), Flow Pipe Sensor (116), the Environmental Sensors (118) and Soil Moisture Sensors (119).

Figure 4:
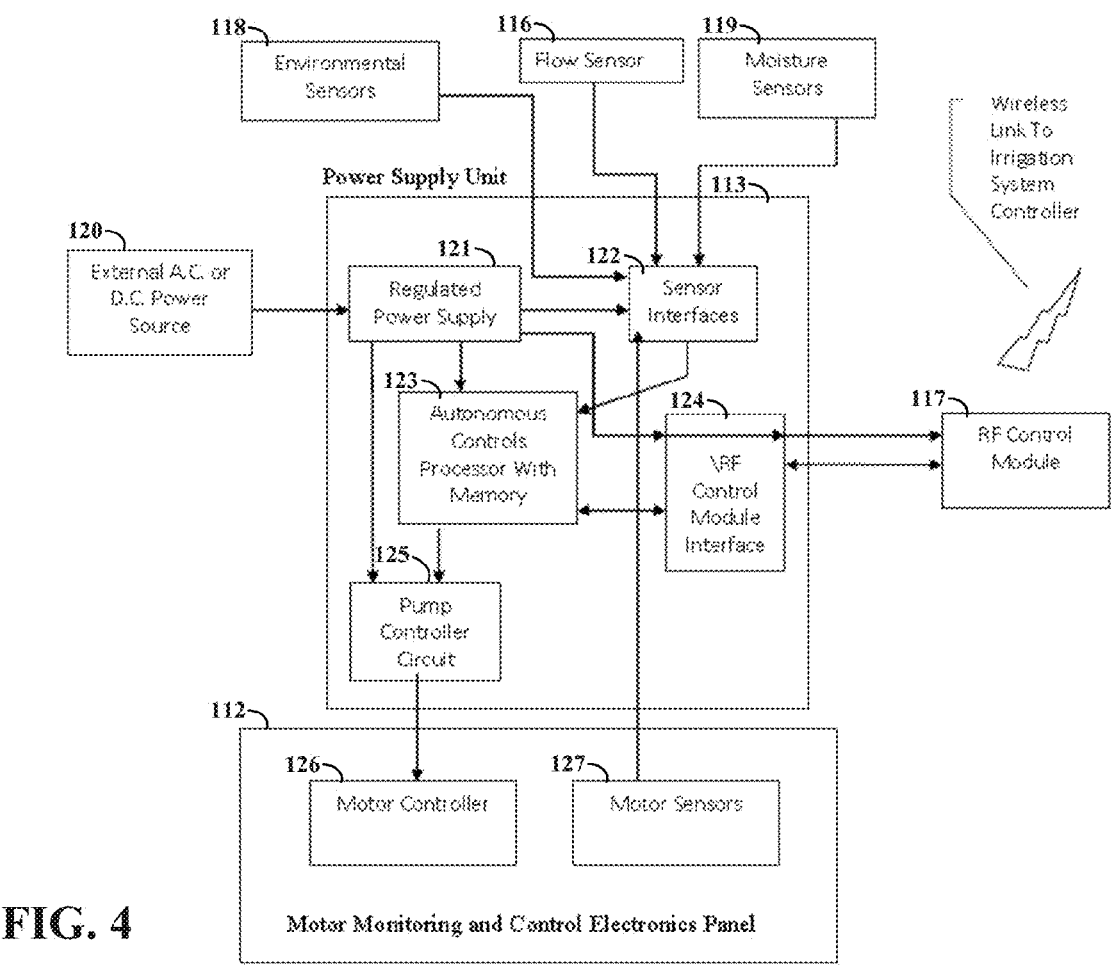
FIG. 4 shows a power supply apparatus, in accordance with another embodiment.

FIG. 4 shows a Power Supply Unit (113) block diagram and input and output connections to the device. The Power Supply Unit (113) contains a Regulated Power Supply (121) which takes power from External AC or DC Power Sources (120) and conditions it for proper voltage and current levels for internal circuits. Motor Sensors (127) contained in the Motor Monitoring and Control Electronics Panel (112), Environmental Sensors (118), the Flow Sensor (116) and Moisture Sensors (119) are connected to the Power Supply Unit (113) via Sensor Interface Circuits (122) for signal conditioning. These conditioned signals are then passed on to the Autonomous Controls Processor with Memory (123), where software routines process the data input.

The Pump Control Circuit (125) is contained within the Power Supply Unit (113) and is the interface to the Motor Controller (126) contained within the Motor Monitoring and Control Electronics Panel (112). The Pump Control Circuit (125) commands the Motor Controller (126) to turn on or off the Motor. The Pump Control Circuit (125) is commanded by the Autonomous Control Processor with Memory (123) containing software routines that will monitor all of the I/O into the box and provide preprogrammed pump turn on and turn off as well as emergency shutdown signals to the Motor Control (126) if the RF Control Module (117) is not connected or functioning. Otherwise the Irrigation Systems Controller (101) maintains control at each pump location via the wireless link.

The Power Supply Unit (113) processes and passes through sensor signals to the RF Control Module (117) via a serial bus to RF Module Interface (124). The RF Module Interface (124) also provides power to the RF Control Module (117). The RF Control Module (117) provides for wireless communications between Power Supply Unit (113) and Irrigation System Controller (101) at the Farm HQ (102).

Figure 5:
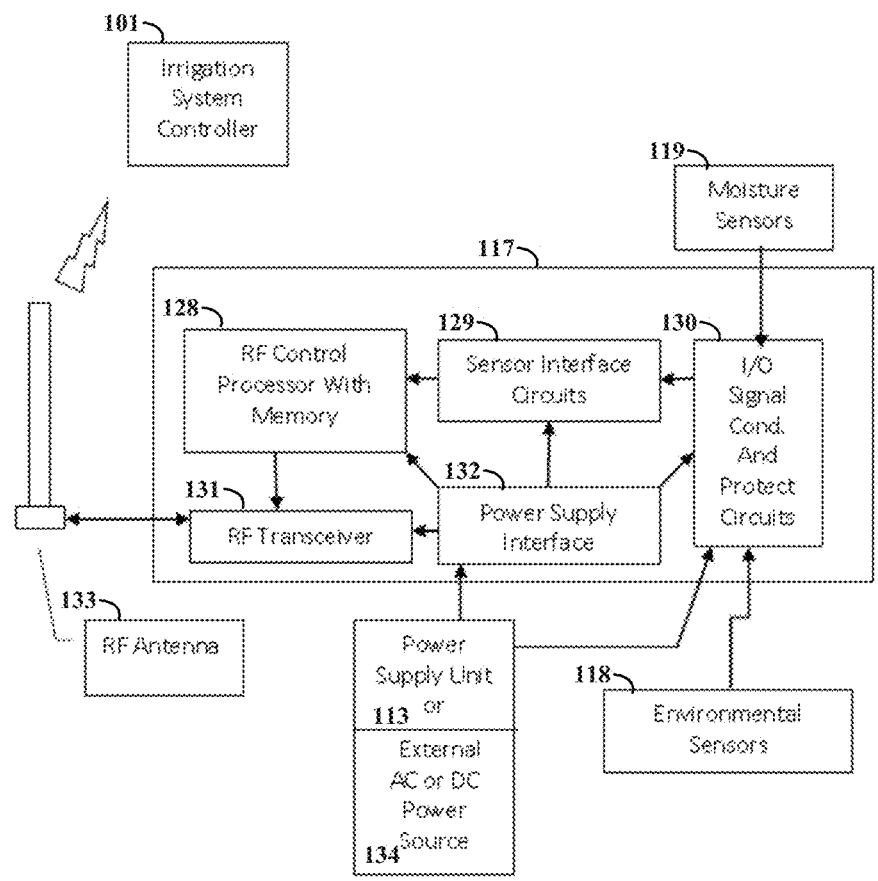
FIG. 5 shows a communication apparatus, in accordance with another embodiment.

FIG. 5 shows an RF Control Module (117) block diagram. The RF Control Module (117) has a Power Supply Interface (132) that receives power from external sources and provides various regulated voltages necessary to operate all other circuits in the RF Control Module (117). These external power sources can either be a Power Supply Unit (113) or an External AC or DC Power Source (134) such as a self-contained solar panel/charge converter/battery power system. The I/O Signal Conditioning and Protect Circuits (130) take digital and analog signals from Moisture Sensors (119), Environmental Sensors (118) and inputs from a Power Supply Unit (113) if connected and scales, clamps and performs other various signal conditioning process as required to make all signals compatible with the Sensor Interface Circuits (129).

The Sensor Interface Circuits (129) routs signals from the I/O Signal Conditioning and Protect Circuits (130) to the RF Control Processor with Memory (128), which then processes analog and digital signals and packetizes them for transmission. The RF Control Processor with Memory (128) reports the signal conditions from the sensors to the Irrigation Control System (101) at the farm HQ (102) by sending this packetized data via the RF Transceiver (131) connected to an RF Antenna (133). If the RF Control Module (117) is used in conjunction with a Power Supply Unit (113) as a Well Pump Controller (100) it receives pump control commands from the Irrigation System Controller (101) and passes it back to the Power Supply Unit (113) which then turn on or off the well pump Motor (114).

The RF Control Module (117) can be used as a standalone environmental or moisture sensor beacon powered by an External AC or DC Power Source (134) such as a battery/charge converter/solar panel unit. Sleep timer software is enabled at the repeater and sensor beacon RF Control Module (117) to minimize current draw. RF Control Module (117) can also be software configured as a Repeater (109 or 108 or 110 or 111) for messages to and from other RF Control Modules (117) to the Irrigation System Controller (101).

Figure 6:
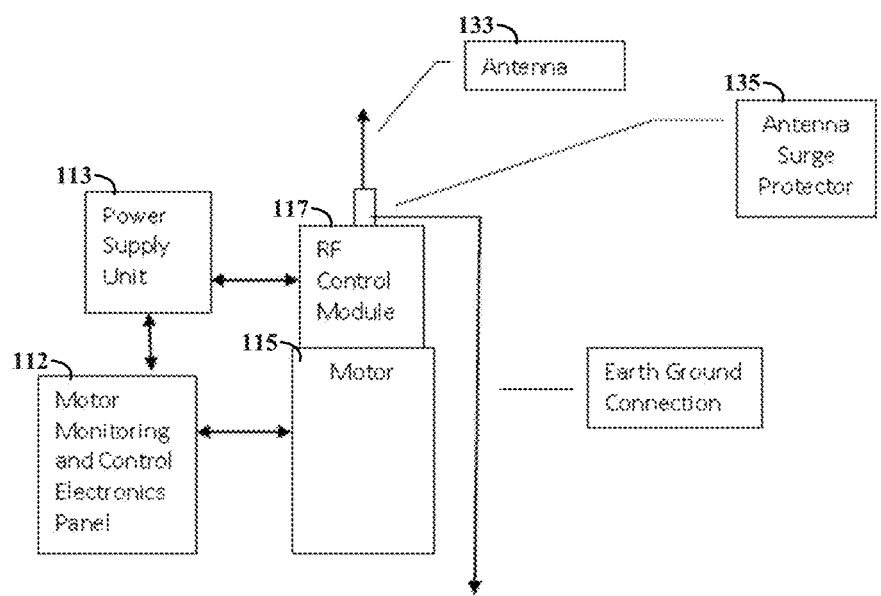
FIG. 6 shows a communication apparatus, in accordance with another embodiment.

FIG. 6 shows an RF Control Module (117) mounted on a well pump motor (115). This mounting means provides a secure, stable platform to mount the RF Control Module (117) connects to the Power Supply Unit (113) which in turn connects to the Motor Monitoring and Control Electronics Panel (112). Mounting the RF Control Module (117) directly to the well pump head provides a reliable earth ground for the antenna Surge Protector (135) and Antenna (133).

Figure 7:
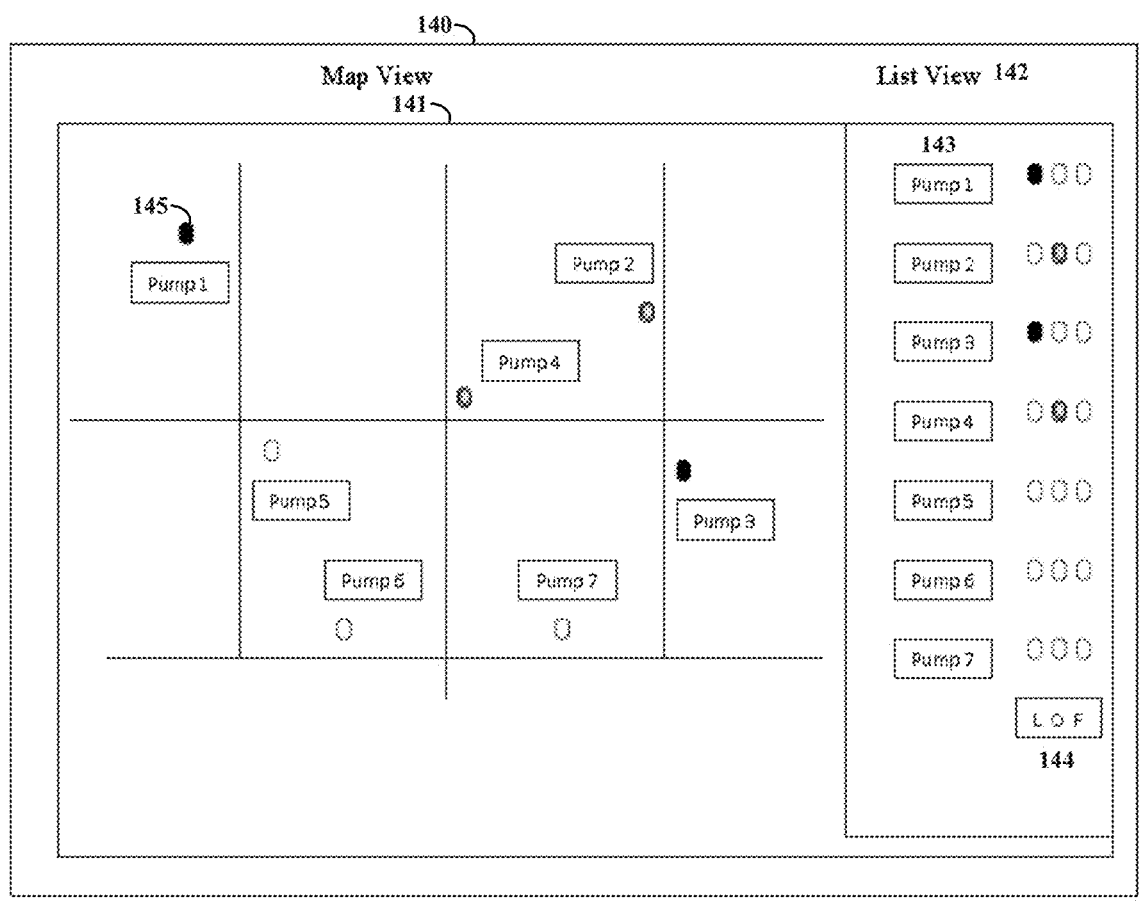
FIG. 7 shows a graphical user interface, in accordance with another embodiment.

FIG. 7 shows a Graphical User Interface (140) that identifies a "One-look" view of the overall farm equipment operational and RF module communication link status. A Map View (141) of the farm will be displayed, with status indicator overlays (145) indicating each equipment location and status. In the list view (142) communication link integrity "L", operational status "O" and fault indications "F" are provided for each pump (144). An icon indicates the pump is on, a shaded icon indicates the pump was turned off, and black indicates the existence of a problem. At a single glance, a user (e.g., farmer) can view the equipment operational status on the entire farm. When the user clicks on any pump icon (145 or 143) a pop-up dialog box will appear showing historical trend data and current operational details such as: a) irrigation start and stop times, b) irrigation advance and saturation rates, and c) suggested future irrigation pump run times.

A basic scheduler within the Graphical User Interface (140) provides a scheduling function that gives the user the opportunity to schedule the on and off times at each pump. This function provides a start time (e.g., 24 hour time indication, or AM or PM), start date, stop time and stop date.

Figure 8:
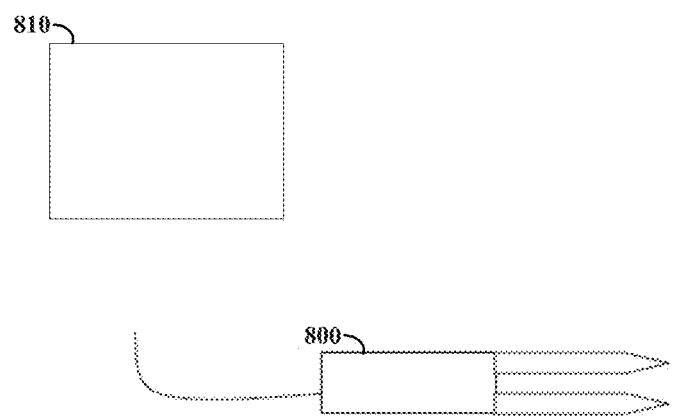
FIG. 8 shows a soil moisture sensor, in accordance with another embodiment.

FIG. 8 shows a soil moisture sensor (800) as may be integrated with one or more embodiments. The soil moisture sensor detects a change in resistance between the two fingers shown in FIG. 8 and sends a corresponding voltage back to a control unit (810) on a 2 conductor wire. In order to expand water conservation practices and reduce irrigation runoff, a system uses manageable number of un-calibrated sensors. This will allow the user to transition from traditional manual control processes to more of a smart irrigation decision making process. A predictive pump turn-off control algorithm is based on measuring field irrigation advance rates and soil moisture saturation data trends.

Various embodiments are directed to a system that allows the use of un-calibrated moisture sensors. Out of box calibration accuracy for some implementations is usually specified as +/−5% for the soil moisture sensor. Although running a site-specific calibration profile can improve the accuracy to +/−1%, calibration is a time consuming process. Factory calibration equations may be sufficient. The relative change in readings is monitored over time, which can alleviate the need to rely on absolute values from each sensor. In this way, it can be determined when a sensor approaches equilibrium and that the saturation or drying out points have been reached in the soil around the sensor.

Figure 9:
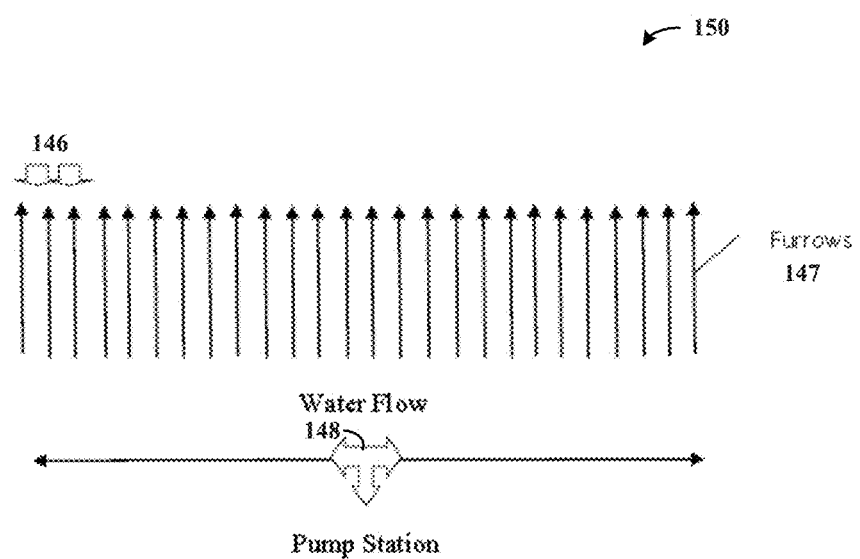
FIG. 9 shows an implement of sensor placement points, in accordance with another embodiment.

FIG. 9 shows sensor placements in an irrigated field Pump Zone (150), in accordance with one or more embodiments. Procedures are implemented for determining irrigation advance and saturation rates. Four sensors are connected to each free-standing RF module/battery/solar panel station. Two sets of sensors (146) are buried at the end of two of the Furrows (147) that "get wet last" during the irrigation process (e.g., the furthest point from the pump station (148) in a precision graded field Pump Zone (150). Within each of the two adjacent rows, one sensor is placed in two inches of soil and the other placed at the effective crop root depth. The sensors placed two inches deep will become saturated quickly as water reaches their locations (indicating the irrigation advance rate and therefore a "reference starting point" of the whole field saturation process). The sensors placed at the effective crop root depth will take more time to become saturated, indicating the entire Pump Zone (150) is getting close to saturation as well. While only two individual sensors may be sufficient at each Pump Zone (150), the additional two sensors will provide a higher degree of confidence in the information gathered. Also, if one of the four sensors in a given location responds oddly compared to the others at that site, it could be flagged as malfunctioning.

Pump turn-off may be controlled based on real time field conditions by measuring or determining; a) irrigation start times as indicated by the flow switch sensor at the pump; b) irrigation advance rates as indicated by the sensors placed two inches deep; c) end-of-row saturation of sensors placed at the effective root depth; and d) lag time as a function of the time difference between when the water first covers the two-inch-deep sensor and when it reaches equilibrium at the deep sensor in order to establish the "runoff" start time. Instead of using a timer for manual pump turn off decisions such as: "turn on the pump, wait N number of minutes based on a rule of thumb or field simulation model, and then turn it off", the aforementioned procedure for turn-off decision making processes can be used to achieve run-off reduction without inducing crop stress.

Irrigation advance and saturation rates are a function of environmental, soil, and crop conditions, and therefore are ever changing. Systems in accordance with one or more embodiments adapt to changes in rate values which are used for each next turn-off event calculation, providing an improved estimate of the timing of acceptable saturation levels and recommended pump turn off sequences in each Pump Zone (150).

Figure 10:
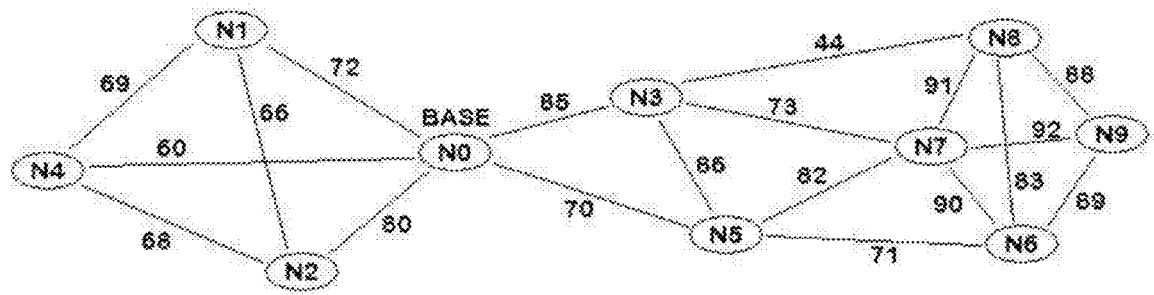
FIG. 10 shows a network apparatus, in accordance with another embodiment.

Various embodiments are directed to host-managed routing and rerouting within a medium-large scale distributed RF network. FIG. 10 shows a related embodiment involving a Ten Node Communication Network Layout. The Base is N0 and the remaining 9 remotes are N1-N9. Where implemented with FIG. 1, the Irrigation System Controller Base (101) identified in FIG. 1 includes an RF Control Module (117) connected to a Local PC at Farm HQ (102) with a user interface, hereafter collectively referred to as Node 0 "N0" in FIG. 10. The systems also includes a number of Well Pump Controllers (100) also shown in FIG. 1 that contain RF Control Modules (117), hereafter collectively referred to as "Remotes" N1-N9 in FIG. 10.

The computer system with user interface connected to Node 0 (e.g., a PC with monitor and mouse) runs a program that will interface with the RF base module and initiate all outgoing RF messages, monitor all incoming RF responses and provide status and control of the network, as well as the attached equipment, to the user via a Graphical User Interface (140) (e.g., as shown in FIG. 7).

Within a medium-large scale (100-1000 nodes) distributed (meaning not all nodes are within direct range of each other) RF network there are many methods for sending messages from one node to another. Various embodiments are directed to a system that implements a single node designated as an RF "Base" shown as (NO) in FIG. 10, which is connected to a control and data gathering computer system, and some larger number (100-1000) of nodes designated as RF "remotes" designated as nodes N1-N9; these nodes are distributed over a large area for control and monitoring of industrial and/or agricultural equipment. This large area may be over 100 square miles, in which the base will not be able to maintain a direct RF connection with many of the remotes. FIG. 10 shows that N0 has a direct connection to N3, N5, N1, N2 and N4—indicated by the straight lines connecting each back to "N0". For those nodes that are not in range of the Base N0 (Nodes N6-N9), the remotes N3 and N5 in FIG. 10 which are within range to the Base function as: i) repeaters to relay messages to and from Nodes N6-N9—as well; ii) as control/monitoring endpoints for the wells they are directly connected to.

In some implementations, the Base is pre-configured to have knowledge of all the remote nodes within its network, so that remote nodes cannot be added on the fly, but would have to be added to the data table configuration of the base, and be known by a unique serial number by the base.

In various implementations, the remotes do not transmit any RF messages over the airwaves until they receive a message from the base instructing them to do so. The base will maintain a database of the RF signal integrity between all nodes in the network, and when it wishes to send a message to a remote node that is not within its RF range, it will dictate a routing pattern leading to the distant remote, and only the remotes along that routing path will participate in relaying the message, as well as the routing path back to the base for the response from the distant remote. If the transfer of the message fails somewhere along the path to or from the distant remote, the base will update its database of link integrity, choose a different route to the distant remote, and re-transmit.

Configuration setup can be implemented in a variety of manners. It may be known to a user which pieces of equipment need to be controlled and monitored, as well as which RF node were attached to each piece of equipment. These may be cross-referenced by serial number (or some other unique ID embedded within the node) by the configuration utility running on the PC. Each remote is connected to the PC in turn, and, through the configuration utility, have its serial number read, its function defined (e.g., whether it were a simple repeater or, if connected to a piece of equipment, the functions of the piece of equipment that are to be monitored and/or controlled), and other parameters as needed (e.g., a user-friendly descriptive name). These data are stored into non-volatile memory in the remote, as well as the configuration file stored on the PC. Also, for the sake of simplifying the algorithms that follow, the configuration utility stores the serial or ID numbers of the nodes in an array, with that of the base being at index 0, such that the remotes can be referenced by their index 1 through N (for N remotes). In other words, the remotes may be known by their index (and the indices would be contiguous) and if the actual serial or ID number were needed at some point, it can be stored at index N of the array for remote N.

A variety of communication strategies are implemented to suit particular applications. In some implementations, a remote will only transmit a message if it is in response to a message received by the base, or if it is repeating a message to or from the base to another node. This reduces RF traffic within the network to only the nodes that need to be involved. There may be, however, external contributors to overall local RF activity, so retries and hold-offs may still be employed in these cases via a link discovery process. After the base computer is configured to know of all remote nodes that should be in its network, it will begin pinging all of them, multiple times each, to build a table of link integrity between itself and all the remote nodes, as well as between all nodes.

FIG. 11 shows a link discovery table. Once a discovery process is complete this resulting table shown in FIG. 11 may include one or more entries for which the base could not establish a direct link. For the sake of discussion let us say that an entry of zero in the table indicates a remote node for which there were no direct links. Entries of 1-100 indicate the integrity of the link to the remote node where a link exists, where 1 indicates the weakest link and 100 the strongest. An entry of −1 would indicate the strength of the link between a node and itself (a trivial entry, used mostly as a flag to complete the table). The base will then instruct the nodes which have direct links with the base to ping every node in the network. This process is repeated with the indirect nodes until the link integrity table is filled completely. An example 10 node network (e.g., as discussed above) is shown in FIG. 11 with integrity figures given on the links that are non-zero.

In FIG. 11, the links are represented as being symmetrical by way of example, where the link integrity is the same in both directions. This may not always be the case, if, for instance, the RF receiver circuitry in a given node is marginal. The rows of the table indicate the link integrity in the transmit direction from the corresponding node in the left column to the node listed on the top row. Similarly the columns of the table indicate the link integrity in the receive direction.

FIG. 12 shows a symmetrical link integrity table. If needed, an asymmetrical network could be represented as a symmetrical network by filling the link entries for transmit and receive integrity with the lesser of the two. In the case mentioned above, where the receiver circuitry of a node are marginal, the link can be represented by the smaller integrity indicator for the purposes of routing messages, but the program running at the base would detect this asymmetry and notify the user of the faulty node so it could be serviced or replaced.

A benefit of symmetrical links is that only the forward routing path would need to be specified in a message sent from the base, and that routing path can be used in reverse to send a reply back to the base. This reduces the message length, and thus improves throughput and error immunity. The symmetry also reduces the computational complexity in calculating optimum message routing. Another benefit is that the table can be stored using $(N^2-N)/2$ bytes instead of $N^2$ bytes. Other embodiments involve asymmetric links, to suit particular applications.

Message routing and route selection is carried out in a variety of manners. A base maintains a list of routes from itself to each remote in the network. The routes themselves will be of variable length, so they could be stored as a linked-list data structure. This will be referred to as the "Routing Data Structure." Since a route is only as strong as its weakest link, the term "Route Strength" may be defined as the strength of the weakest link in a route. For the 10 node network in FIG. 10, an algorithm can be implemented to choose a strongest route from the base to a remote to be stored in the Routing Data Structure. With this, these routes can be stored as follows:

R1=N0→N1
R2=N0→N2
R3=N0→N3
R4=N0→N1→N4
R5=N0→N3→N5
R6=N0→N3→N5→N7→N6
R7=N0→N3→N5→N7
R8=N0→N3→N5→N7→N8
R9=N0→N3→N5→N7→N9

Figure 13:
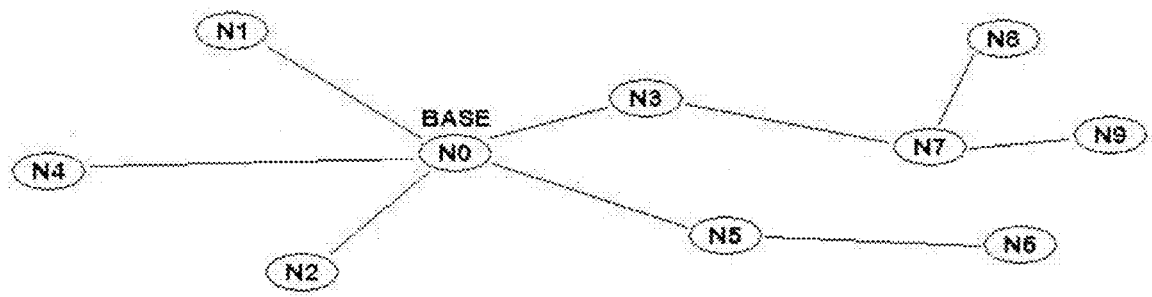
FIG. 13 shows a network routing apparatus, in accordance with another embodiment.

FIG. 13 shows an approach for routing configuration of a ten node network. Another consideration (beyond Route Strength) is the number of hops through repeaters a message must take to get to its destination remote. The more hops a message takes, the longer the latency involved in getting the message to and from its destination, the longer the message becomes (due to an increase in the routing information encoded into the message) and the greater the probability of errors due to RF noise and interference. When an algorithm that favored the routes that had the fewest hops through repeaters is used with a strongest route among those, then the following routes (the others remain the same) would be:

R4=N0→N4
R5=N0→N5
R6=N0→N5→N6
R7=N0→N3→N7
R8=N0→N3→N8
R9=N0→N3→N7→N9

Starting with the latter algorithm and imposing a threshold on the minimum strength a route could have, a degree of headroom is provided for link integrity, without needlessly adding hops to an otherwise simpler route. If we arbitrarily choose a value of 50 as the "Integrity Threshold," the link between N3 and N8 (with a strength of 44) would be disqualified, and R8 would be written as:

R8=N0→N3→N7→N8

This algorithm is used in accordance with various embodiments. This algorithm can be used for choosing a route from a selection of possible routes with known strengths and is referred to as the "Route Selection Algorithm," with other algorithms used to implement routing.

If we now look at the all the routes derived by the Route Selection Algorithm, we have:

R1=N0→N1
R2=N0→N2
R3=N0→N3
R4=N0→N4
R5=N0→N5
R6=N0→N5→N6
R7=N0→N3→N7
R8=N0→N3→N7→N8
R9=N0→N3→N7→N9

Inspecting these, it is seen that the routes R8 and R9 both start with the route to N7. Since the route to N7 has already been defined as R7, we could rewrite R8 and R9 as:

R8=R7→N8
R9=R7→N9

If nodes fail in the field, re-routing can be carried out. If, for the case above, N1 were to fail, the definition of R7 could be changed as follows:

R7=N0→N5→N7

And the above routes for N8 and N9 would still be correct. If we look further into this indirection, it is seen that we could also apply this to R6 and R7, as follows:

R6=R5→N6
R7=R3→N7

Inspecting these again, we see that all routes start with N0, and all routes Rn end with Nn. The Routing Data Structure can be stored as an array of previously discovered routes, rather than the linked list that was considered earlier. For instance, using the notation from above, we had:

Rn=Rm→Nn

This is stored as:

RoutingDataStructure[n]=m

If m=0 (i.e., the base were the previous, or parent, node), this would flag a one-hop route. If we arbitrarily initialized the Routing Data Structure to −1 for every entry before the discovery phase, then any entry that remains −1 signifies a node that could not be routed.

In some embodiments, the routing data structure (hereafter referred to as RDS[0 . . . N], or for a single element, RDS[n]) as simplified to an array of predecessor (or parent) nodes, the data structure is implemented with additional data pertaining to each node in the array (i.e., each node in the network). So, instead of the RDS[0 . . . N] referring simply to an array of parent nodes, it is an array of structures for certain embodiments in which each structure element shall contain the parent node of the indexed node, the strength of the link between the parent node and the indexed node, and the number of hops from the base to the indexed node. In other words, in C pseudo-code:

RDS[IndexedNode]=(ParentID, ParentLinkStrength, HopLevel);

The entry for the base contains flags so that the processing routines could handle all nodes generically, and would be defined to contain:

RDS[0]=(−1, −1, 0);

The Link Integrity Tables and the selection of routes may be implemented in a variety of manners. In some embodiments, the creation of both the Link Integrity Tables and the RDS[0 . . . N] can be achieved during the initial network discovery phase. The system may maintain both an asymmetrical and symmetrical version of the Link Integrity Table. As stated before, the first part of the discovery phase is for the base to ping every node configured to be included in the network. A remote being pinged will measure the link integrity of the ping request from the base (the receive integrity), and include this parameter in its response back to the base. When the base receives this response, it will measure the link integrity of the response (the transmit integrity). This process will be repeated some number of times upon the node, the results averaged (receive and transmit separately), and the results stored into the appropriate cells of the asymmetrical Link Integrity Table. The lesser of these two values will be stored into the symmetrical Link Integrity Table, and if this value is greater than the Integrity Threshold, the node will be added to the RDS[0 . . . N] (as a one-hop route). This would be repeated until all the one-hop nodes were discovered.

Each one-hop node is instructed to ping every node in the network (except the nodes that had already pinged the network themselves), one node at a time. For each node it is instructed to ping, it responds back to the base with the receive and transmit link integrity of the pings. These values are added to the Link Integrity Tables. After all the one-hop nodes complete this polling process, the base PC inspects the symmetrical Link Integrity Table for the remote nodes that were not already designated as one-hop nodes to find the nodes that had links to the one-hop nodes with integrity values greater than the Integrity Threshold. Of these, the base selects the one-hop node that had the strongest link integrity with the two-hop node being inspected. This route is added to the RDS[0 . . . N] as a two-hop route. The two-hop nodes are instructed to ping every node in the network except the nodes that had already pinged the network themselves). The two-hop nodes reports back to the base (through its one-hop parent node) with those values, and they are added to the tables as before.

This is repeated until all the two-hop nodes had pinged the network. The routes with the strongest link (above the Integrity Threshold) from a two-hop node to each three-hop node are added to the RDS[0 . . . N]. Then the three-hop nodes ping the remainder of the nodes in the network that had not already pinged the network themselves, and so on until all remote nodes in the network had been discovered. If this process is repeated n times, the n-hop nodes are instructed to ping each other to complete the Link Integrity Tables (even though no new routes would come from this). If a remote node that was configured to be a part of the network are not discovered (or found with a link strength less than the Integrity Threshold), a notification to the user is posted to that effect.

Further optimizations to reduce RF network traffic is carried out for particular embodiments. During a network discovery phase, the base has complete control of the actions of the remotes at the lowest level. In other words, the base encodes the complete routing path of the ping instructions into the ping request message. Once the discovery phase is complete, and RDS[0 . . . N] had been completely created, information to establish the hierarchy of interconnections between all the nodes of the network is defined. If RDS[0 . . . N] were transferred to the all the remotes in the network, each remote could compute and maintain an array of its own "children" nodes. This Child Array is hereafter referred to as CAn[0 . . . N], where each element is defined as CAn[m], where n is the ID of the node that owns the array, m is the ID of the ultimate target node, and CAn[m] is the ID of the child node that is the immediate next hop on the route to the ultimate target node (ID=m).

RDS[n] describes the relationship of node n to its parent node, and CAn[0 . . . N] lists the direct children of node n. It should also be noted that the remote may extract limited data from the RDS[0 . . . N] as is its parent node and it's CAn[0 . . . N]. While the base could pre-compute the CAn[0 . . . N] arrays for each remote in the system and then transmit them to each remote, it may actually require less RF traffic if the base were to simply transmit the full RDS[0 . . . N] to all of its children (the one-hop remotes), and have these nodes transfer the RDS[0 . . . N] to their children, and so on, until every node had a local copy. Then, each node computes its unique CAn[0 . . . N] array. This approach can be implemented with various embodiments.

The choice of an array for CAn[0 . . . N] illustrates the concept of how the forward routing path of a message is represented in accordance with one or more embodiments. The fact that these arrays will tend to be fairly sparse (except CA0[0 . . . N], which will be packed) can facilitate a linked list approach. Also, while all remotes may have exactly one parent node, each remote may have many or zero child nodes.

As an example of forward routing can be implemented with routes from the example 10 node network above as follows:
R1=N0→N1
R2=N0→N2
R3=N0→N3
R4=N0→N4
R5=N0→N5
R6=N0→N5→N6
R7=N0→N3→N7
R8=N0→N3→N7→N8
R9=N0→N3→N7→N9

The defined values of the Child Array for node 3, CA3[0 . . . 9] are:
CA3[7]=CA3[8]=CA3[9]=7. All other CA3[0 . . . 9]= −1=no successor
Node 5 is another remote for which a child node (to node 6) exists:
CA5[6]=6. All other CA5[0 . . . 9]=−1=no successor
The base creates its own Child Array, CA0[0 . . . N]:
CA0[0]=−1
CA0[1]=1
CA0[2]=2
CA0[3]=3
CA0[4]=4
CA0[5]=5
CA0[6]=5
CA0[7]=3
CA0[8]=3
CA0[9]=3

Using node 9 as an example ultimate target, if the base wants to send a message to node 9, it inspects CA0[9] to find that node 3 is the next hop child from the base on the route to node 9. It sends a message to node 3 instructing it to forward the message to node 9. Node 3 inspects its CA3[9] and finds that the child between it and node 9 is node 7, to which it sends the message to be forwarded to node 9. Node 7 inspects CA7[9], which would simply be node 9 itself, to which node 7 forwards the message. After node 9 completed whatever action is requested, it sends a reply to its parent (which is node 7) to be routed to the base (node 0). Node 7 finds its parent to be node 3, and transfers the reply to it, which then transfers the reply back to the base (node 0).

Various embodiments are directed to dynamic link strength tracking. Nodes measure the link integrity of all incoming messages, whether downstream (away from the base) or upstream (back toward the base). This may be implemented in a manner that does not create any additional overhead in RF traffic, and is a measurement that all nodes automatically make on any RF messages they receive. These measurements can be averaged out over time by each node (and may be implemented to suit particular applications, such as the average of the last arbitrary number of readings, or a slow moving IIR filter). This process can be executed transparently such that nodes that are performing below par are identified without necessarily implementing further pinging operations. The base can slowly request the averaged link integrity data from remotes as part of normal polling cycles, and update its Link Integrity Tables. Through this process, the base will be able to identify a link with a sub-par strength.

In addition to the slow background collection of link strength of the links, as described above, the base may periodically instruct each node to ping the nodes for which links existed during the network discovery phase, but the strength of which was either below the Integrity Threshold (e.g., 50), or had not been chosen because a stronger link existed to another node of the same hop level. In the case of links that had strength less than the Integrity Threshold, a lesser value may be used, termed the Usability Threshold (20, for example), to determine which links would be included in this background link strength collection activity. This way, the links that are initially considered potentially usable (above the Usability Threshold) can be relatively freshly updated, and the Link Integrity Tables updated accordingly. This Usability Threshold can be used for deciding which nodes should be included in the background data collection so that, as with environmental changes that could bring a once sufficient link below the Integrity Threshold, environmental changes could bring a once sub-par link back above the Integrity Threshold. Links with strength below the Usability Threshold are considered too weak to be useful (e.g., completely out of range), and can be excluded from the background polling. Through this background link strength polling, the Link Integrity Tables are constantly dynamically updated to represent the most current state of the network. This way, when a problem with a node occurs, the problem is a computational task executed by the base (e.g., PC, or master controller), and does not involve additional RF traffic for link polling when a problem is detected.

Dynamic rerouting is implemented in a variety of manners. In some implementations, after the network is set up and running, operations are carried out to address environmental changes or hardware failures that cause the network to stop performing as it did when the discovery phase was first executed. Two example classes of failures that can be dealt with are noted in the following, and, subsequently, two different examples can be employed to solve the issue at hand. The first issue is when a once stable link has fallen below the Integrity Threshold. The second is when a node fails completely and cannot maintain a link with any other node whatsoever.

Weak (but semi-functional) links can be handled as follows. If a particular remote node n has a sub-par link with its parent node, an alternate route to node n is ascertained, with adequate link strength and the minimum number of hops (e.g., replace its current parent node). This involves checking the link strengths in the Link Integrity Table for node n, and choosing the node with the strongest link above the Integrity Threshold at the lowest hop level to be its new parent. Once this is found, a message is sent to the sub-par parent of node n (plus all the nodes in the route from the base to the sub-par parent, if any), instructing them to remove node n from their Child Arrays. Then a message is sent to the new parent of node n (plus all the nodes in the route from the base to the new parent, if any), instructing them to add node n to their Child Arrays. In implementations where local copies of the RDS[0 . . . N] are transferred to all the nodes (so that they would derive their own CA[0 . . . N] arrays), a broadcast is sent to all nodes instructing them to update their RDS[0 . . . N] arrays such that the new parent node of node n is stored in RDS[n]. Once the rerouting of node n is complete, regular operation can continue. If a new route could not be found with adequate strength, current routing can be left intact, and a user can be notified to correct the problem such as by improving the antenna installation or by adding an additional node between node n and its parent to act as a repeater.

Dynamic Rerouting to Handle a Failed Node—if a node fails catastrophically, a user is notified to service the site of the node and resolve the problem. To keep as much of the network functioning as possible following the failure of node n, the base will attempt to find alternate routes to the children of node n. Node n and all its children are removed from all the CA[0 . . . N] arrays in which any is referenced. The base will use the Link Integrity Tables to find the strongest route with the minimum number of hops to all the orphaned child nodes. If the only route found to one of more child nodes were of sub-par strength, it is still used, and a notification is posted to the user to this effect.

In both cases above, the failing performance of a node can be handled by updates to the data structures of the nodes that were directly involved in the routing between the base, the failing node, and its children—all using data that was already accumulated within the base PC. This method effectively keeps the network running as best as circumstances allow without an excess of RF activity.

Asymmetrical routing may be implemented in a variety of manners. In some implementations, messages are routed separately for outbound and inbound messages, each node has a transmit parent and a receive parent, plus maintains a separate database for receive and transmit child nodes. The same algorithm as above can be applied separately to outgoing and incoming messages, and the size of the routing databases stored in each node can be doubled. This approach opens the possibility of a node being at a different hop level for outgoing vs. incoming messages, but in a case where there is a difference between the two, the larger hop level may be the same as it would have been using symmetrical routing, and the smaller hop level of the other direction will represent an improvement of that route.

In accordance with one or more aspects, which may be implemented consistent with aspects of a Frequency Hopping Spread Spectrum (FHSS) system, RF transmissions are periodically switched between some numbers of RF channels (i.e. frequencies). For instance, the 900 MHz ISM band spans the range of frequencies from 902 MHz-928 MHz, and this range can be broken into some number of channels (~50). The base will cycle its broadcasts among these channels, using a predefined pattern, and remotes that have not already synchronized with the pattern will listen on a particular channel until they receive a synchronizing message. From that point onward, a remote will know when to switch frequencies, and to which frequency to hop. In some implementations FHSS is used (e.g., relative to a fixed carrier frequency), such that for a given RF path from transmitter to receiver, multi-path fading will only effect a few of the RF channels (the same is true for interference from external sources of RF noise, or RF jammers). The pattern of hopping can be pseudo-random, such that all channels are used equally often. If statistics of the strength of the links in a distributed RF network are collected over time, a pattern of hopping could be employed that favored the channels that produced the strongest links (e.g., as adaptive FHSS). If we return now to the concept of the parent-self-children relationship each node maintains, each node can be seen as a form of "base" to its children, and can use its own statistically chosen pattern. With this in mind, a node can communicate with its parent using the pattern established by its parent, and that node would establish its own pattern for communicating with its children. In addition to creating more robust links within the network, this approach may reduce the time it takes a node to re-synchronize with its parent (if a link is temporarily lost), since a node would choose to listen to the statistically most likely used channel to re-gain its connection with its parent.

The following embodiments may be implemented with embodiments shown in one or more of the figures, or as discussed above. For instance, such embodiments may be implemented in agricultural, manufacturing and other environments.

Other embodiments are directed to an apparatus, method or system involving equipment monitoring, surveillance, and/or environmental monitoring in which autonomous control is carried out at equipment sites having: i) sufficient memory and processing power for the intended control to continue uninterrupted in the event of loss of communications with the host computer, and ii) retention of network routing paths once communications is reestablished. Autonomous communications can be configured as: i) a link from a central computer to a device to be controlled; ii) a repeater for messages to and from other RF modules or iii) a standalone sensor beacon powered by a battery/solar panel unit with sleep timer software enabled in the repeater and sensor beacon RF module to maximize battery life.

Certain embodiments are directed to a wireless monitoring control system, apparatus or method involving the control of remotely-located equipment, including a) an autonomous controller at each equipment site, b) an autonomous communications circuit with the host and other nodes at each equipment site; c) a centralized computer for control of all end points as well as d) a remote server system. In some implementations, the autonomous controller at each equipment site has i) sufficient memory and processing power for the intended control to continue uninterrupted in the event of loss of communications with the host computer, and ii) retention of network routing paths once communications is reestablished. In certain implementations, the autonomous communications circuit can be configured as: i) a link from the central computer to the device to be controlled; ii) a repeater for messages to and from other RF modules or iii) a standalone sensor beacon powered by a battery/solar panel unit with sleep timer software enabled in the repeater and sensor beacon RF module to maximize battery life.

A centralized computer and software application may control the end points and provide update routines that can be pushed out on the network to all nodes for new scheduling, functionality of autonomous control, routing or bug fixes and feature enhancements. In certain implementations, a remote system server and control server provide i) remote login via a secure link ii) aggregation of both site specific, regional and global data, iii) web based access to a centralized computer for system control via remote computer and or smart devices, iv) secure, remote backup of site specific data and v) remote diagnosis of site problems and software updates to the system.

Another embodiment is directed to a wireless monitoring and control system that includes a graphical user interface on the centralized host computer that:
- a) Facilitates "one look" monitoring of farm equipment, sensors and communications devices with icon on map overlays;
- b) Provides "one touch" control with dedicated function control buttons;
- c) Provides a list view of all monitored equipment with status indicator and pump identification labelling indicating each equipment location and status;
- d) Provides easily reconfigurable scheduling routines by data input at the user interface;
- e) Includes user configurable data aggregation of a wide variety of system variables and constants, including data reduction with visualization of interdependent trends as selected by the user; and
- f) Provides user selectable adaptive learning and automation control method for both site specific control points as well as overall system "global" control.

Other embodiments are directed to a wireless monitoring and control system with multi-purpose hardware configurations for monitoring and control including a) a control module for each piece of equipment to be controlled; and b) a communications module, in which
- a) a separate and dedicated control module contains i) software control routines and ii) interface drivers that are specific to the piece of equipment being controlled; and
- b) the communications module can be configured as: i) a link from the central computer to the device to be controlled which can be mounted away from the control module; ii) a repeater for messages to and from other RF modules and the host or iii) a standalone sensor beacon with multiple sensor inputs powered by a battery/solar panel unit; and may include iv) a sleep timer software is enabled at the repeater and sensor beacon RF module to maximize battery life and v) built in surge protection.

Another embodiment is directed to a wireless monitoring and control system involving a precision irrigation control system for farms using sensors at the furthest extreme of respective pump zones to create a pump turn off algorithms to help minimize off-field migration of soil, water, fertilizers, pesticides and herbicides and reduce the consumption of water, fertilizers, pesticides and herbicides. Aspects include:
- a) Monitoring rate-of change and sensor reading equilibrium as opposed to absolute data values, allowing un-calibrated sensors to be used;
- b) Providing notifications of the need to add fertilizer based on limit triggers from nutrient sensors;
- c) Employing a predictive pump turn off routine calculated as a function of i) the irrigation advance rate, ii) when the deep root sensors become saturated and iii) an absorption rate lag time;
- d) Optional manual control of critical turn-on decisions at both the control end point, from the central control PC as well as from remote located processors via a secure web connection; and
- e) Interruption of turn on routines by monitoring environmental and soil moisture sensors even when the pumps are not running indicating current rain events and pending changes in the environment.

Other embodiments are directed to a wireless monitoring and control system providing energy savings, reduced labor costs, increased equipment life and reduced down time based on:
- a) Monitoring performance parameters of the pump and motor;
- b) Monitoring warning indicators;
- c) Monitoring fault alarms;
- d) Monitoring process variable limit triggers;
- e) Monitoring environmental factors;
- f) Monitoring actual run times;
- g) Providing remote control of pumps eliminating on site manual intervention for on and off functions;
- h) Controlling pump rates and motor speed based on these monitored parameters; and
- i) Sending maintenance and repair notifications based on these monitored parameters.

Still other embodiments are directed to a wireless monitoring and control system that reduces stress on crops and increases crop yields via watering schedules that include adaptive learning routines based on changes in environmental factors, actual crop growth rates and maturity levels, and preprogrammed data tables of watering schedules dictated by crop type and maturity time periods.

One or more embodiments are directed to a wireless monitoring and control system for geographically large areas utilizing host managed network routing paths such that:
- a) A single "host" node is connected to a control and data gathering computer system, and wirelessly connected to "n" number of nodes designated as RF "remotes";
- b) A host maintains a database of the RF signal integrity between all nodes in the network. This database is used to i) determine a dictate a routing pattern leading to the distant remote, and only the remotes along that routing path will participate in relaying the message, and ii) determining the routing path back to the base for the response from the distant remote; and
- c) Remotes function as repeaters as well as control/monitoring endpoints. A remote will only transmit a message if it is in response to a message received by the base, or if it is repeating a message to or from the base.

A wireless monitoring and control system is operated in some embodiments, for geographically large areas utilizing a link performance discovery method in a host managed network including:
- a) Host pings all nodes to build a table of transmit and receive link integrity between itself and all remote nodes;
- b) The host then instructs the nodes which it has direct links with to ping every node in the network; and
- c) This process is repeated with the indirect nodes until the link integrity of both transmit and receive signal strength of all nodes to all other nodes is recorded by the host.

Further embodiments are directed to a wireless monitoring and control system for geographically large areas for establishing all routing paths in a host managed network by:

a) Choosing the strongest route from the base to a remote to be stored as direct links to the base;
b) Choosing a routing data structure for all other nodes dictating the strongest routing between each of them;
c) Choosing a routes that had the fewest hops through repeaters; and
d) The choice of strongest route among those is based on a threshold on the minimum strength a route could have.

A wireless monitoring and control system, for certain embodiments involving geographically large areas, utilizes data structure optimization and storage routine in a host managed network including:
a) The storage of the routing data structure with each structure element containing the parent node of the indexed node, the strength of the link between the host node and the indexed node, and the number of hops from the host to the indexed node defined as: RDS [IndexedNode]=(ParentID, ParentLinkStrength, HopLevel);
b) Transfer of routing paths to all the remotes in the network, where each remote will compute and maintain unique arrays of its own "children" nodes, further minimizing network traffic and providing autonomous routing at each remote node.

In some embodiments, a wireless monitoring and control system for geographically large areas utilizes adaptive learning routines to maximize quality of service in a host managed network via:
a) Monitoring changes in transmit and receive link strength integrity between all nodes;
b) Averaging these changes over time in the link integrity tables without unnecessary additional pinging;
c) Once sub-par performance has been identified, instructing each node to ping all other nodes to repeat the full link discovery process; and
d) Re-optimizing both outgoing and incoming routing paths to and from the base such that the system performs a learning and self-healing process.

Another wireless monitoring and control system, in other embodiments, for geographically large areas utilizes adaptive spread spectrum frequency hopping to further maximize quality of service in a host managed network by:
a) Measuring transmit and receive link strengths for all paths at all spread spectrum frequencies utilized by each node in the system as it communicates to all other nodes;
b) Apply averaging to the strength of the links in this RF network which are collected over time;
c) Determine a pattern of hopping that favored the channels that produced the strongest links; and
d) Establish routing for a remote node communicating with its parent using the preferred transmission frequencies as established by its parent, with that node would also establish its own preferred transmission frequencies for communicating with its children.

Copyright Notice: A portion of this disclosure contains material that is subject to copyright protection. The owner has no objection to the facsimile reproduction by any one of the patent document or patent disclosure, as it appears in the Patent and Trademark Office Patent File or records, but otherwise reserves all copyrights whatsoever.

Various blocks, modules or other circuits may be implemented to carry out one or more of the operations and activities described herein and/or shown in the figures. In these contexts, a "block" (also sometimes "logic circuitry" or "module") is a circuit that carries out one or more of these or related operations/activities (e.g., sensors, slave circuits, or master circuit). For example, in certain of the above-discussed embodiments, one or more modules are discrete logic circuits or programmable logic circuits configured and arranged for implementing these operations/activities, as in the circuit modules shown in the Figures. In certain embodiments, such a programmable circuit is one or more computer circuits programmed to execute a set (or sets) of instructions (and/or configuration data). The instructions (and/or configuration data) can be in the form of firmware or software stored in and accessible from a memory (circuit). As an example, first and second modules include a combination of a CPU hardware-based circuit and a set of instructions in the form of firmware, where the first module includes a first CPU hardware circuit with one set of instructions and the second module includes a second CPU hardware circuit with another set of instructions.

Certain embodiments are directed to a computer program product (e.g., nonvolatile memory device), which includes a machine or computer-readable medium having stored thereon instructions which may be executed by a computer (or other electronic device) to perform these operations/activities.

Based upon the above discussion and illustrations, those skilled in the art will readily recognize that various modifications and changes may be made to the various embodiments without strictly following the exemplary embodiments and applications illustrated and described herein.

For example, various embodiments described separately may be implemented together, or aspects described together may be implemented separately. In addition, the various embodiments described herein may be combined in certain embodiments, and various aspects of individual embodiments may be implemented as separate embodiments. Such modifications do not depart from the true spirit and scope of various aspects of the invention, including aspects set forth in the claims.

What is claimed is:

1. An apparatus comprising:
a plurality of sensor circuits respectively located at different geographical regions, each sensor circuit being configured and arranged to monitor an environmental characteristic;
a plurality of slave control circuits having an input port coupled to receive communications indicative of the monitored environmental characteristic from at least one of the sensor circuits, having a wireless communication circuit configured and arranged to wirelessly communicate with wireless communication circuits at other ones of the slave control circuits, and having a computer processor circuit configured and arranged to control operational equipment to which the received communications pertain by outputting control signals to the operational equipment based upon the received communications and the monitored environmental characteristic; and
a master control circuit having a wireless communication circuit configured and arranged to wirelessly communicate with the wireless communication circuits at the slave control circuits, and having a computer processor circuit configured and arranged with the slave control circuits and the wireless communication circuits to wirelessly communicate using a wireless-based communications network with wireless communication links between ones of the slave control circuits and at least one wireless link between the master control circuit and one of the slave control circuits, by monitoring communication characteristics of a plurality of communications paths between the master control circuit and one of the slave control circuits, each communication path including at least two of the wireless communication links and at least one of the slave control circuits via which communications are passed to another one of the slave control circuits, selecting one of the communication paths based upon the monitored communication characteristics, and using the selected one of the communication paths, communicating data between the master control circuit and the one of the slave control circuits.

2. The apparatus of claim 1, wherein selecting one of the communication paths includes selecting the one of the communication paths based on monitored communication characteristics changing over time.

3. The apparatus of claim 2, wherein
the geographical regions include agricultural crops,
the sensor circuits are configured and arranged to monitor environmental characteristics that affect the growth of the crops, and
selecting the one of the communication paths includes selecting a communication path in response to crop growth that affects the wireless-based communications via the communication paths.

4. The apparatus of claim 1, wherein selecting one of the communication paths includes selecting a communication path based upon communication characteristics of different ones of the communication paths, the characteristics being selected from the group of: interference, received signal strength indication (RSSI), bit error rate (BER).

5. The apparatus of claim 1, wherein the master control circuit is configured and arranged with the slave control circuits to select and use a frequency for communicating via the wireless-based communications network, based upon the monitored communication characteristics.

6. The apparatus of claim 1, wherein at least one of the slave control circuits is configured and arranged to
monitor communication characteristics of a plurality of communications paths between the slave control circuit and other ones of the slave control circuits,
select one of the communication paths based upon the monitored communication characteristics, and
communicate data between the master control circuit and one of the slave control circuits using the selected one of the communication paths.

7. The apparatus of claim 1, wherein the master control circuit is configured and arranged with one of the slave control circuits to communicate data to the one of the slave control circuits, based upon sensor data received from one of the sensor circuits, that causes the one of the slave control circuits to control equipment to which it is connected.

8. The apparatus of claim 1, wherein at least one of the slave control circuits is configured and arranged to autonomously control equipment to which it is connected, independently from information communicated by the master control circuit, in response to sensor data received from one of the sensor circuits connected to the one of the slave control circuits.

9. The apparatus of claim 1, wherein the master control circuit is configured and arranged with the slave control circuits to monitor the communication characteristics by calculating an indication of multipath interference based upon received signal strength and bit error rate for respective ones of the communication paths.

10. The apparatus of claim 1, wherein the master control circuit is configured and arranged with the slave control circuits to communicate data based upon a data in a routing table indicative of communication paths through respective ones of the slave circuits, and to update the routing table with data representing new routing path links based upon the monitored communication characteristics.

11. The apparatus of claim 1, wherein the master control circuit is configured and arranged with the slave control circuits to select a communication path along which to communicate based upon characteristics of the respective paths including path length and path interference, and to store data indicative of the selected communications path for access by at least one of the master control circuit and one of the slave control circuits.

12. The apparatus of claim 1, wherein the master control circuit is configured and arranged with the slave control circuits to communicate data between the master control circuit and the one of the slave control circuits using different paths for communicating data from the master control circuit to the one of the slave control circuits and for communicating data from the one of the slave control circuits to the master control circuit.

13. The apparatus of claim 1, wherein the environmental characteristic includes a characteristic selected from the group of: atmospheric conditions, chemical characteristics, organic characteristics and operational equipment characteristics.

14. The apparatus of claim 1, wherein each slave control circuit is configured and arranged to:
in response to receiving operating instructions from the master control circuit, outputting the control signal based on the received operating instructions and storing the operating instructions in memory connected to the slave control circuit, and
in response to communications between the slave control circuit and the master control circuit being interrupted, output the control signals based on the stored operating instructions.

15. The apparatus of claim 1, wherein the master control circuit is configured and arranged with the slave control circuits to ascertain integrity of communication links with respective ones of the slave control circuits, by:
ascertain transmit and receive integrity of communication links between the master control circuit and the slave control circuits by communicating between the master control circuit and the slave control circuits via the wireless communication circuits,
ascertain transmit and receive integrity of communication links between the slave control circuits by controlling each slave control circuit to communicate with other slave control circuits directly connected thereto; and
store a data table including data that characterizes transmit and receive integrity of the communication links between the master control circuit and the slave control circuits, and of the communication links between the slave control circuits, wherein selecting the one of the communication paths includes selecting the one of the communication paths based upon the data in the data table.

16. The apparatus of claim 15, wherein the master control circuit is configured and arranged with the slave control circuits to, in response to detecting a drop in communication integrity in communications via one of the slave control circuits, controlling the one of the slave control circuits to re-ascertain the transmit and receive integrity of communication links between the one of the slave control circuits and other ones of the slave control circuits, and overwriting data in the data table that characterizes the transmit and receive integrity of the communication links with the one of the slave control circuits.

17. An apparatus comprising:
a wireless communication circuit configured and arranged to communicate with a multitude of slave control circuits at disparate geographical regions using a wireless-based communications network;
a monitoring circuit configured and arranged with the wireless communication circuit to monitor communication characteristics of a plurality of communications paths via which data is communicated with the slave control circuits, at least some of the communication paths including at least one of the slave control circuits via which communications are passed to another one of the slave control circuits;
a routing circuit configured and arranged to, for each of the slave control circuits, select at least one of the communication paths for communicating with the slave control circuit based upon the monitored communication characteristics; and
a control circuit configured and arranged with the wireless communication circuit, the monitoring circuit and routing circuit to, for each slave control circuit,
control operation of the slave control circuit by communicating operational instructions to the slave control circuit using the selected one of the communication paths for the slave control circuit,
ascertain environmental characteristics sensed by each slave control circuit via the selected one of the communication paths,
in response to the ascertained environmental characteristics, modify operation of the slave control circuit by communicating revised operational instructions to the slave control circuit using the selected one of the communication paths, and
in response to the monitoring circuit selecting a different one of the communication paths, communicating with the slave control circuit using the different one of the communication paths.

18. The apparatus of claim 17, wherein the control circuit is configured and arranged to control operation of the slave control circuit by transmitting equipment operational instructions that control the slave control circuit to operate equipment connected to the slave control circuit, based upon the ascertained environmental characteristics.

19. The apparatus of claim 17, further including the slave control circuits.

20. A method comprising:
monitoring an environmental characteristic at each of a plurality of sensor circuits respectively located at different geographical regions;
for each of the sensor circuits, communicating data indicative of the monitored environmental characteristic to one of a plurality of slave control circuits and to a master control circuit;
at each slave control circuit, controlling operational equipment by outputting control signals to the operational equipment based upon operational instructions received from the master control circuit and based on the monitored environmental characteristic; and
at a master control circuit, wirelessly communicating the operational instructions with the slave control circuits using a wireless-based communications network with wireless communication links between ones of the slave control circuits and at least one wireless link between the master control circuit and one of the slave control circuits, by
monitoring communication characteristics of a plurality of communications paths between the master control circuit and one of the slave control circuits, each communication path including at least two of the wireless communication links and at least one of the slave control circuits via which communications are passed to another one of the slave control circuits,
selecting one of the communication paths based upon the monitored communication characteristics, and
using the selected one of the communication paths, communicating the operational instructions between the master control circuit and the one of the slave control circuits.

\* \* \* \* \*